United States Patent
Shiplacoff et al.

(10) Patent No.: US 10,268,358 B2
(45) Date of Patent: *Apr. 23, 2019

(54) SELECTIVE HIBERNATION OF ACTIVITIES IN AN ELECTRONIC DEVICE

(71) Applicant: QUALCOMM Incorporated, San Diego, CA (US)

(72) Inventors: Daniel Marc Gatan Shiplacoff, Los Angeles, CA (US); Matias Gonzalo Duarte, Sunnyvale, CA (US); Jeremy Godfrey Lyon, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 598 days.

This patent is subject to a terminal disclaimer.

(21) Appl. No.: 15/003,451

(22) Filed: Jan. 21, 2016

(65) Prior Publication Data

US 2016/0154558 A1 Jun. 2, 2016

Related U.S. Application Data

(63) Continuation of application No. 12/505,541, filed on Jul. 20, 2009, now Pat. No. 9,274,807.

(51) Int. Cl.
*G06F 3/0485* (2013.01)
*G06F 1/3234* (2019.01)
(Continued)

(52) U.S. Cl.
CPC .......... *G06F 3/0485* (2013.01); *G06F 1/3225* (2013.01); *G06F 1/3243* (2013.01);
(Continued)

(58) Field of Classification Search
CPC .. G06F 3/0485; G06F 3/04842; G06F 3/0482; G06F 3/0481; G06F 3/0483;
(Continued)

(56) References Cited

U.S. PATENT DOCUMENTS

| 4,680,577 A | 7/1987 | Straayer et al. |
| 5,146,556 A | 9/1992 | Hullot et al. |

(Continued)

FOREIGN PATENT DOCUMENTS

| AU | 2008100003 A4 | 2/2008 |
| CN | 1540509 A | 10/2004 |

(Continued)

OTHER PUBLICATIONS

"SBSettings Offers Faster Method to Manage iPhone Settings iPhone Hacks," iphonehacks.com, Archive.org date: Feb. 9, 2009, 4 pages, retrieved from: https://web.archive.org/web/20090209111621/ http://www.iphonehacks.com/2009/02/sbsettingsoffersfastermethod tomanageyouriphonesettings.html.

(Continued)

*Primary Examiner* — Ajay M Bhatia
*Assistant Examiner* — Mong-Shune Chung
(74) *Attorney, Agent, or Firm* — Paradice and Li LLP

(57) ABSTRACT

In an electronic device capable of running multiple software applications concurrently, applications, documents, cards, or other activities can be selected for hibernation so as to free up system resources for other activities that are in active use. A determination is made as to which activities should hibernate, for example based on a determination as to which activities have not been used recently or based on relative resource usage. When an activity is to hibernate, its state is preserved on a storage medium such as a disk, so that the activity can later be revived in the same state and the user can continue with the same task that was being performed before the activity entered hibernation.

35 Claims, 16 Drawing Sheets

(51) Int. Cl.

| | |
|---|---|
| *G06F 3/0481* | (2013.01) |
| *G09G 5/14* | (2006.01) |
| *G06F 3/0483* | (2013.01) |
| *G06F 9/4401* | (2018.01) |
| *G06F 3/0482* | (2013.01) |
| *G06F 3/0484* | (2013.01) |
| *G06F 1/3225* | (2019.01) |
| *G06F 1/3287* | (2019.01) |
| *G06F 1/3228* | (2019.01) |
| *H04W 52/02* | (2009.01) |
| *H04M 1/725* | (2006.01) |

(52) U.S. Cl.
CPC .......... *G06F 1/3275* (2013.01); *G06F 3/0481* (2013.01); *G06F 3/0482* (2013.01); *G06F 3/0483* (2013.01); *G06F 3/04842* (2013.01); *G06F 9/4418* (2013.01); *G09G 5/14* (2013.01); *G06F 1/3228* (2013.01); *G06F 1/3287* (2013.01); *H04M 1/72522* (2013.01); *H04W 52/0264* (2013.01); *Y02D 10/14* (2018.01); *Y02D 50/20* (2018.01); *Y02D 70/00* (2018.01); *Y02D 70/12* (2018.01); *Y02D 70/122* (2018.01); *Y02D 70/144* (2018.01)

(58) Field of Classification Search
CPC .... G06F 1/3225; G06F 1/3275; G06F 1/3243; G06F 1/3287; G06F 1/3228; G06F 9/4418; G09G 5/14; Y02D 70/12; Y02D 70/122; Y02D 70/00; Y02D 70/144; Y02D 10/14; Y02D 50/20; H04M 1/72522; H04W 52/0264
See application file for complete search history.

(56) References Cited

U.S. PATENT DOCUMENTS

| | | | |
|---|---|---|---|
| 5,499,330 A | 3/1996 | Lucas et al. |
| 5,499,334 A | 3/1996 | Staab |
| 5,574,846 A | 11/1996 | Yoshimura et al. |
| 5,586,244 A | 12/1996 | Berry et al. |
| 5,610,828 A | 3/1997 | Kodosky et al. |
| 5,675,361 A | 10/1997 | Santilli |
| 5,677,708 A | 10/1997 | Matthews, III et al. |
| 5,737,622 A | 4/1998 | Rogers et al. |
| 5,766,708 A | 6/1998 | Panizza |
| 5,892,511 A | 4/1999 | Gelsinger et al. |
| 5,944,829 A | 8/1999 | Shimoda |
| 5,954,820 A | 9/1999 | Hetzler |
| 5,978,923 A | 11/1999 | Kou |
| 6,011,537 A | 1/2000 | Slotznick |
| 6,061,050 A | 5/2000 | Allport et al. |
| 6,166,736 A | 12/2000 | Hugh |
| 6,182,231 B1 | 1/2001 | Gilgen |
| 6,323,846 B1 | 11/2001 | Westerman et al. |
| 6,407,757 B1 | 6/2002 | Ho |
| 6,441,881 B1 | 8/2002 | Enomoto et al. |
| 6,466,237 B1 | 10/2002 | Miyao et al. |
| 6,509,911 B1 | 1/2003 | Shimotono |
| 6,570,557 B1 | 5/2003 | Westerman et al. |
| 6,577,330 B1 | 6/2003 | Tsuda et al. |
| 6,590,593 B1 | 7/2003 | Robertson et al. |
| 6,600,936 B1 | 7/2003 | Kaerkkaeinen et al. |
| 6,613,100 B2 | 9/2003 | Miller |
| 6,677,932 B1 | 1/2004 | Westerman |
| 6,680,677 B1 | 1/2004 | Tiphane |
| 6,686,906 B2 | 2/2004 | Salminen et al. |
| 6,765,559 B2 | 7/2004 | Hayakawa |
| 6,785,012 B2 | 8/2004 | Okazawa |
| 6,924,789 B2 | 8/2005 | Bick |
| 6,952,248 B2 | 10/2005 | Oshima et al. |
| 6,992,658 B2 | 1/2006 | Wu et al. |
| 7,030,861 B1 | 4/2006 | Westerman et al. |
| 7,051,291 B2 | 5/2006 | Sciammarella et al. |
| 7,073,052 B2 | 7/2006 | Brown et al. |
| 7,120,806 B1 | 10/2006 | Codilian et al. |
| 7,137,115 B2 | 11/2006 | Sakamoto et al. |
| 7,151,528 B2 | 12/2006 | Taylor et al. |
| 7,159,176 B2 | 1/2007 | Billmaier et al. |
| 7,170,500 B2 | 1/2007 | Canova et al. |
| 7,352,363 B2 | 4/2008 | Coates et al. |
| 7,360,166 B1 | 4/2008 | Krzanowski |
| 7,383,451 B2 | 6/2008 | Matsushima et al. |
| 7,394,452 B2 | 7/2008 | Wong et al. |
| 7,479,949 B2 | 1/2009 | Jobs et al. |
| 7,650,569 B1 | 1/2010 | Allen et al. |
| 7,663,607 B2 | 2/2010 | Hotelling et al. |
| D615,989 S | 5/2010 | Chaudhri |
| 7,747,965 B2 | 6/2010 | Holecek et al. |
| 7,800,592 B2 | 9/2010 | Kerr et al. |
| 7,822,443 B2 | 10/2010 | Kim et al. |
| 7,853,567 B2 | 12/2010 | Cisler et al. |
| 7,934,168 B2 | 4/2011 | Sakamoto et al. |
| 7,978,177 B2 | 7/2011 | Nash et al. |
| 8,001,479 B2 | 8/2011 | Katsuranis et al. |
| 8,063,872 B2 | 11/2011 | Forstall et al. |
| 8,069,362 B2 | 11/2011 | Gebhart et al. |
| 8,136,047 B2 | 3/2012 | Holecek et al. |
| 8,176,486 B2 | 5/2012 | Amir Husain |
| 8,272,952 B2 | 9/2012 | Manning et al. |
| 8,296,684 B2 | 10/2012 | Duarte et al. |
| 8,365,091 B2 | 1/2013 | Young et al. |
| 8,407,603 B2 | 3/2013 | Christie et al. |
| 8,510,577 B2 | 8/2013 | Scott et al. |
| 8,555,185 B2 | 10/2013 | Louch et al. |
| 8,683,362 B2 | 3/2014 | Shiplacoff et al. |
| 8,713,241 B2 | 4/2014 | Borras et al. |
| 8,719,359 B2 | 5/2014 | Barman et al. |
| 2002/0089536 A1 | 7/2002 | Dang |
| 2002/0109735 A1 | 8/2002 | Chang et al. |
| 2002/0191013 A1 | 12/2002 | Abrams |
| 2003/0148799 A1 | 8/2003 | Chen |
| 2004/0100479 A1 | 5/2004 | Nakano et al. |
| 2004/0181674 A1 | 9/2004 | Theimer |
| 2004/0189720 A1 | 9/2004 | Wilson et al. |
| 2004/0216100 A1 | 10/2004 | Bower et al. |
| 2004/0255254 A1 | 12/2004 | Weingart et al. |
| 2004/0261039 A1 | 12/2004 | Pagan |
| 2005/0003851 A1 | 1/2005 | Chrysochoos et al. |
| 2005/0021336 A1 | 1/2005 | Katsuranis |
| 2005/0021917 A1 | 1/2005 | Mathur et al. |
| 2005/0024322 A1 | 2/2005 | Kupka |
| 2005/0038933 A1 | 2/2005 | Himmel et al. |
| 2005/0052446 A1 | 3/2005 | Plut |
| 2005/0054372 A1 | 3/2005 | Tsuda et al. |
| 2005/0057524 A1 | 3/2005 | Hill et al. |
| 2005/0078093 A1 | 4/2005 | Peterson et al. |
| 2005/0088416 A1 | 4/2005 | Hollingsworth |
| 2005/0102638 A1 | 5/2005 | Jiang et al. |
| 2005/0149879 A1 | 7/2005 | Jobs et al. |
| 2005/0173863 A1 | 8/2005 | Walker et al. |
| 2005/0190280 A1 | 9/2005 | Haas et al. |
| 2005/0192924 A1 | 9/2005 | Drucker et al. |
| 2005/0235332 A1 | 10/2005 | Manson et al. |
| 2005/0240699 A1 | 10/2005 | Yoder et al. |
| 2005/0243053 A1 | 11/2005 | Liess et al. |
| 2006/0001660 A1 | 1/2006 | Plut |
| 2006/0007181 A1 | 1/2006 | Jung et al. |
| 2006/0010395 A1 | 1/2006 | Aaltonen |
| 2006/0015819 A1 | 1/2006 | Hawkins et al. |
| 2006/0015878 A1 | 1/2006 | Ritter |
| 2006/0053387 A1 | 3/2006 | Ording |
| 2006/0075348 A1 | 4/2006 | Xu et al. |
| 2006/0085757 A1 | 4/2006 | Andre et al. |
| 2006/0087502 A1 | 4/2006 | Karidis et al. |
| 2006/0125962 A1 | 6/2006 | Shelton et al. |
| 2006/0129948 A1 | 6/2006 | Hamzy et al. |
| 2006/0156048 A1 | 7/2006 | Hines et al. |
| 2006/0161861 A1* | 7/2006 | Holecek ............... G06F 3/0481 715/782 |
| 2006/0161865 A1 | 7/2006 | Scott et al. |
| 2006/0181548 A1 | 8/2006 | Hafey et al. |

(56) References Cited

U.S. PATENT DOCUMENTS

| | | |
|---|---|---|
| 2006/0197753 A1 | 9/2006 | Hotelling |
| 2006/0218504 A1 | 9/2006 | Hiroi et al. |
| 2006/0224986 A1 | 10/2006 | Lindsay et al. |
| 2006/0224989 A1 | 10/2006 | Pettiross et al. |
| 2006/0227125 A1 | 10/2006 | Wong et al. |
| 2006/0267951 A1 | 11/2006 | Rainisto |
| 2007/0004451 A1 | 1/2007 | Anderson |
| 2007/0073650 A1 | 3/2007 | Lueck |
| 2007/0101292 A1 | 5/2007 | Kupka |
| 2007/0101297 A1 | 5/2007 | Forstall et al. |
| 2007/0152984 A1 | 7/2007 | Ording et al. |
| 2007/0165004 A1 | 7/2007 | Seelhammer et al. |
| 2007/0220440 A1 | 9/2007 | Song et al. |
| 2007/0226647 A1 | 9/2007 | Louch |
| 2007/0226655 A1 | 9/2007 | Shimizu |
| 2007/0236475 A1 | 10/2007 | Wherry |
| 2007/0245263 A1 | 10/2007 | Hale et al. |
| 2007/0247431 A1 | 10/2007 | Skillman et al. |
| 2007/0250730 A1 | 10/2007 | Reece et al. |
| 2007/0252552 A1 | 11/2007 | Walrath |
| 2007/0273668 A1 | 11/2007 | Park et al. |
| 2007/0277124 A1 | 11/2007 | Shin et al. |
| 2007/0288860 A1 | 12/2007 | Ording et al. |
| 2007/0296709 A1 | 12/2007 | Guanghai |
| 2008/0034317 A1 | 2/2008 | Fard et al. |
| 2008/0055265 A1 | 3/2008 | Bewley et al. |
| 2008/0062139 A1 | 3/2008 | Hotelling et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0064499 A1 | 3/2008 | Grant et al. |
| 2008/0082930 A1 | 4/2008 | Omernick et al. |
| 2008/0084440 A1 | 4/2008 | Omata et al. |
| 2008/0100593 A1 | 5/2008 | Skillman et al. |
| 2008/0104438 A1 | 5/2008 | Yokoyama et al. |
| 2008/0104544 A1 | 5/2008 | Collins et al. |
| 2008/0148149 A1 | 6/2008 | Singh et al. |
| 2008/0168235 A1 | 7/2008 | Watson et al. |
| 2008/0168379 A1 | 7/2008 | Forstall et al. |
| 2008/0168401 A1 | 7/2008 | Boule et al. |
| 2008/0204460 A1 | 8/2008 | Marinkovic et al. |
| 2008/0281689 A1 | 11/2008 | Blinnikka et al. |
| 2008/0297484 A1 | 12/2008 | Park et al. |
| 2008/0298697 A1 | 12/2008 | Lee |
| 2008/0303794 A1 | 12/2008 | Bolt et al. |
| 2008/0307335 A1 | 12/2008 | Chaudhri et al. |
| 2008/0316183 A1 | 12/2008 | Westerman et al. |
| 2009/0013282 A1 | 1/2009 | Mercer |
| 2009/0016323 A1 | 1/2009 | Ethier et al. |
| 2009/0019031 A1 | 1/2009 | Krovitz et al. |
| 2009/0070691 A1 | 3/2009 | Jain |
| 2009/0089692 A1 | 4/2009 | Morris |
| 2009/0113444 A1* | 4/2009 | Hackborn .......... G06F 9/461 719/312 |
| 2009/0164928 A1 | 6/2009 | Brown et al. |
| 2009/0183120 A1 | 7/2009 | Ording et al. |
| 2009/0193364 A1 | 7/2009 | Jarrett et al. |
| 2009/0199241 A1 | 8/2009 | Unger et al. |
| 2009/0259958 A1 | 10/2009 | Ban |
| 2009/0278806 A1 | 11/2009 | Duarte et al. |
| 2010/0060586 A1 | 3/2010 | Pisula et al. |
| 2010/0081475 A1 | 4/2010 | Chiang et al. |
| 2010/0156656 A1 | 6/2010 | Duarte et al. |
| 2010/0156813 A1 | 6/2010 | Duarte et al. |
| 2010/0169766 A1 | 7/2010 | Duarte et al. |
| 2010/0211872 A1* | 8/2010 | Rolston .......... G06F 3/0482 715/702 |
| 2010/0214278 A1 | 8/2010 | Miura |
| 2010/0235787 A1 | 9/2010 | Couse et al. |
| 2010/0295801 A1 | 11/2010 | Bestle et al. |
| 2011/0016417 A1 | 1/2011 | Shiplacoff et al. |
| 2016/0147543 A1 | 5/2016 | Shiplacoff et al. |

FOREIGN PATENT DOCUMENTS

| | | |
|---|---|---|
| CN | 1613246 A | 5/2005 |
| CN | 1756400 A | 4/2006 |
| CN | 1801096 A | 7/2006 |
| CN | 1896921 A | 1/2007 |
| CN | 101167045 A | 4/2008 |
| EP | 0349458 A2 | 1/1990 |
| EP | 0548646 A1 | 6/1993 |
| EP | 1453286 A1 | 9/2004 |
| EP | 1462921 A2 | 9/2004 |
| EP | 1688830 A1 | 8/2006 |
| EP | 2076000 A2 | 7/2009 |
| GB | 2480777 A | 11/2011 |
| KR | 100799565 B1 | 1/2008 |
| WO | WO-2008030976 A2 | 3/2008 |
| WO | WO-2009076974 A1 | 6/2009 |
| WO | WO-2010096219 A2 | 8/2010 |

OTHER PUBLICATIONS

Examination Report, Application No. GB1219131.8, dated Nov. 26, 2012, pp. 1-8.
Extended European Search Report, European Application No. 09751303.0, dated Apr. 2, 2012, pp. 1-6.
Extended European Search Report, European Application No. 09751304.8, dated Apr. 3, 2012, pp. 1-6.
GB Examination Report, Application No. GB1021636.4, dated Mar. 20, 2012, pp. 1-3.
GB Examination Report, Patent Application No. GB1021630.7, dated Jan. 24, 2012, pp. 1-5.
"How to use Aero Flip 3D and AltTab in Windows 7," online-techtips.com, May 30, 2009, Archive.org date: Jun. 1, 2009, 4 pages, retrieved from: https://web.archive.org/web/20090601220511/http://www.onlinetechtips.com/windows7/aeroflip3d ndalttabinwindows7/.
IPhone User's Guide, Chapter 5, pp. 58-59, Apple Safari Browser, "Opening Multiple Webpages at Once," (2007).
"Jailbreak App Backgrounder Which Allows Iphone Apps to Run in the Background Updated Iphone Hacks," iphonehacks.com, May 24, 2009, Archive.org date: May 26, 2009, 3 pages, retrieved from: https://web.archive.org/web/20090526230657/http://www.iphonehacks.com/2009/05/jailbreak-app-backgrounder-which-allowsiphone- apps-to-run-in-the-background-updated.html.
Supplementary European Search Report—EP10802592—Search Authority—The Hague—Aug. 5, 2014.
European Search Report—EP17205386—Search Authority—The Hague—Feb. 27, 2018.

* cited by examiner

SELECTIVE HIBERNATION OF ACTIVITIES IN AN ELECTRONIC DEVICE

CROSS-REFERENCE TO RELATED APPLICATION

This application is a continuation of and claims priority to co-pending and commonly-owned U.S. patent application Ser. No. 12/505,541 titled "SELECTIVE HIBERNATION OF ACTIVITIES IN AN ELECTRONIC DEVICE," filed Jul. 20, 2009, which is hereby incorporated by reference in its entirety.

TECHNICAL FIELD

In various embodiments, the present invention relates to application management in electronic devices, and more particularly to systems and methods for selectively causing activities, such as applications, to hibernate in a computing environment wherein multiple applications can be open concurrently.

BACKGROUND OF RELATED ART

Many currently available computing devices run operating systems that offer users the opportunity to run several software applications at the same time, and even to perform several activities simultaneously, within a single software application and/or among two or more software applications. For example, a user may open an e-mail application, a word processing application, an on-screen calculator, and a web browser, so that all of the applications are open concurrently. The user may open several documents within the word processing application, and may open several e-mail messages. Such an arrangement allows the user to move from one task to another by keeping these various applications and activities open at the same time.

Various visual paradigms are available for presenting multiple concurrently running applications and other activities within a graphical user interface. In some computing systems, multiple overlapping windows are made available, with each window representing an application, document, task, or other activity. A desktop metaphor is often employed, wherein the user can move and resize windows on a display screen by direct manipulation. At any given time, one window has focus (usually indicated as such by being situated on top of the other windows). Other windows may be visible, invisible, or partially visible (for example if they are partially or completely obscured by other windows). A user can switch from one activity to another by causing a different window to have focus; this is commonly accomplished by clicking on a visible portion of the window being activated, or by clicking on a button or icon representing the window in a task bar, quick-launch area, or similar construct. In some operating systems, pop-up menus and/or keyboard shortcuts may be available for switching among applications, documents, or other activities.

In other systems, a card metaphor is used, in which each application or other activity can be represented within an area of the screen. Cards can be moved on a display screen, for example by direct manipulation via a touch-screen user interface. Several card viewing modes can be provided. Various embodiments of a card metaphor are described in related U.S. patent application Ser. No. 12/126,145, filed May 23, 2008, for "Navigating Among Activities in a Computing Device", and related U.S. patent application Ser. No. 12/416,279, filed Apr. 1, 2009, for "Card Metaphor for Activities in a Computing Device", the disclosures of which are incorporated herein by reference.

Such systems provide mechanisms by which several applications and/or other activities can be kept open concurrently, allowing a user to easily switch between activities with minimal overhead. The ability to keep several activities open is advantageous because it avoids the need to repeatedly open and close applications. In addition, many systems (including those described above) allow users to view output from (and/or interact with) two or more activities on a common screen (or on multiple screens) at the same time. Cards or windows from two or more applications can be displayed simultaneously, allowing a user to refer to one while interacting with another, or to perform other tasks that involve interaction with two or more applications. Certain operations benefit greatly from such an arrangement, such as, for example, cutting and pasting content from one application to another.

Mobile devices such as smartphones, personal digital assistants, music players, handheld computers, and the like are becoming increasingly powerful. Many are now able to run several applications concurrently, and to perform sophisticated functions that rival traditional computing devices. However, many such devices have limited computing resources, including limited processor speed and/or available memory. Owing to these limitations, such devices can often run a limited number of applications concurrently; exceeding the limit can cause poor performance, instability, crashes, or other detrimental effects.

In such devices, if a user attempts to open an application, open a document, or initiate another activity that causes a memory or processing limit to be reached, the user may be presented with an error message informing him or her that the requested task cannot be performed unless some applications, documents, windows, cards, or other activities are closed first. Alternatively, the user may be presented with a message simply informing him or her that there is no memory left. At worst, the system may crash and the user may lose valuable data that he or she was working on.

None of these scenarios are satisfactory. What is needed is a system and method that handles resource limitations without impinging on the user's ability to perform the task he or she wishes to perform. What is further needed is a system and method that allows a user to open an activity even when many other activities have been opened, and even in the face of resource limitations on the computing system.

Even when a resource limit is not reached, the continued operation of an activity can be wasteful in terms of system resources, thus having a deleterious effect on the performance of the computing device. Running an application, or keeping a document open, that is not needed can consume valuable computing resources, including memory, processing time, network bandwidth, battery power, or any combination thereof. In some situations, users leave applications and/or documents open even when they are not needed. The user may not realize that an activity still running, or may not understand that the activity is consuming a significant amount of system resources. What is needed, therefore, is a system and method for detecting such conditions and avoiding wasteful use of system resources for activities that are left open but are not in active use.

SUMMARY

In various embodiments, the system and method of the present invention operate in an electronic device capable of running two or more software applications concurrently. In various embodiments, each software application may be capable of opening two or more documents, or enabling two or more activities concurrently. The term "activity" is used herein to refer to a software application, task, document, message, page, image, card, window, content item, or any other construct representing data and/or programmatically definable functionality, and with which the user can interact via a user interface on the electronic device. In various embodiments described herein, activities can be represented by a user interface on a display screen, and a user can interact with activities via an input device. In various embodiments, the electronic device may present multiple concurrent activities using any desired paradigm or metaphor, including for example a desktop metaphor having multiple overlapping windows, or a card metaphor as described in related patent applications mentioned above. For example, in a card metaphor, activities are represented by "cards", which is a term used herein to refer to areas of the screen that can be moved and manipulated by the user. Users interact with cards to launch, terminate, and reorder activities, as well as to navigate among activities and perform other operations.

In various embodiments, some activities may be open but not visible on the display screen; for example they may be moved off-screen, minimized, overlapped, or the like; the user can move items on the display or perform other operations to cause these open activities to become visible. In various embodiments, multiple documents, windows, or cards can be open and active concurrently for a given software application; the term "activity" can refer to the software application itself and/or to individual documents, windows, or cards associated with the software application.

In various embodiments, the system and method of the present invention selectively cause certain activities to hibernate, or "freeze", so as to free up system resources for other activities that are in active use. A determination is made as to which activities should hibernate, for example based on a determination as to which activities have not been used recently or based on relative resource usage. In one embodiment, when an activity is to hibernate, its state is preserved on a storage medium such as a disk, so that the activity can later be revived in the same state and the user can continue with the same task that was being performed before the activity entered hibernation. In a situation where multiple documents, windows, or cards are open and active concurrently for a given software application, the software application itself can hibernate, or individual documents, windows, or cards associated with the software application can hibernate individually.

For purposes of the description provided herein, the term "hibernate" refers to the operation by which an activity (such as an application, document, card, or window) is made dormant, and its current state information is stored in some storage medium, so as to reduce usage of certain system resources such as, for example, memory. In one embodiment, hibernating activities remain visible on-screen, in the same manner as active, or "live", activities, although a distinctive visual characteristic can be applied to inform the user that the activity is hibernating; for example, the activity can be presented in a grayed-out or dimmed fashion, or with a superimposed or adjacent icon indicating that it is hibernating. In other embodiments, other mechanisms can be used to indicate that an activity is hibernating. In other embodiments, no visual indicator is provided to inform the user that the activity is hibernating.

In one embodiment, activities hibernate automatically in response to a determination that additional system resources are needed, or in response to a determination that an activity is having an adverse effect on system performance, or in response to other trigger events or factors. In one embodiment, a determination as to which activities should hibernate is made, based on how recently the activity has been used, the amount of system resources being used by the activity, and/or other factors. In another embodiment, a user can manually specify that one or more activities should hibernate.

In one embodiment, a hibernating activity is revived automatically when a user attempts to interact with the activity. In another embodiment, a hibernating activity is revived automatically when sufficient system resources become available to run the activity without adversely affecting other activities. In another embodiment, a hibernating activity is revived in response to an explicit user command. When an activity is revived, state information is retrieved from storage and, if needed, the activity is re-launched so that the user can resume interacting with it at the same point as when it initially was placed into hibernation.

In one embodiment, revival of a hibernating activity may cause another activity to automatically hibernate, particularly if system resources need to be made available to revive the first activity.

In one embodiment, a hibernating activity may be closed, or dismissed, after some period of time or in response to some event. Such dismissal may be appropriate, for example, when there is some indication that the user is no longer interested in the activity. Dismissal of an activity causes state information to be discarded, although any open data files may be saved.

In some embodiments, rather than automatically causing activities to hibernate and/or be dismissed, the system may prompt the user with a recommendation that one or more activities hibernate and/or be dismissed (either to conserve system resources or for any other reason). The user is then given an opportunity to indicate whether or not the recommended action takes place.

In some embodiments, the user can control whether and when automatic hibernation and/or automatic dismissal takes place, for example via a preferences or options screen.

In some embodiments, activities may hibernate for reasons other than resource management. For example, it may be desirable to maintain a limit on the total number of currently active, or "live", activities, so as to reduce user confusion that may take place if too many activities are active simultaneously. In such an embodiment, activities may hibernate automatically when such a limit is reached. Alternatively, the user may be prompted to select activities for hibernation, while allowing the user to decide whether or not activities should hibernate.

In one embodiment, wherein the invention is implemented in a system using a card metaphor, a persistent positional relationship is established and maintained among cards. The positional relationship can be a one-dimensional sequence or some more complex two-dimensional relationship. The positional relationship is persistent in the sense that it does not change unless the user indicates that it should be changed, or some other event takes place that indicates a change is warranted (such as non-use of an activity, or an activity crashing or being dismissed). In one such an embodiment, cards for hibernating activities can maintain their positions with respect to cards for live activities, although a visual indicator can be provided to denote the hibernation state. In other embodiments, cards are repositioned within the sequence when their activities hibernate, for example by being grouped with one another, or moved to the end of the sequence of cards, or otherwise repositioned to indicate the hibernation state.

In one embodiment, the techniques of the present invention are applied to any activity that can be performed on a computing device or any software element that can appear on a computing device. The use of the term "activity" is intended to refer to any such activity or element, and is not intended to be limited strictly to a self-contained software application. Thus, the hibernation and revival techniques described herein can be applied to software applications as a whole, and/or to individual documents, tasks, dialog boxes, windows, applets, panels, panes, toolbars, menus, content items, images, videos, control panels, or the like.

In one embodiment, the techniques described herein can be combined with the card repositioning and/or grouping techniques described in related U.S. patent application Ser. No. 12/416,279, filed Apr. 1, 2009, for "Card Metaphor for Activities in a Computing Device", the disclosure of which is incorporated herein by reference.

The various features described above and herein can be implemented singly or in any combination, as will be apparent to one skilled in the art. Additional features and advantages will become apparent in the description provided below.

BRIEF DESCRIPTION OF THE DRAWINGS

The accompanying drawings illustrate several embodiments of the invention and, together with the description, serve to explain the principles of the invention. One skilled in the art will recognize that the particular embodiments illustrated in the drawings are merely exemplary, and are not intended to limit the scope of the present invention.

DETAILED DESCRIPTION

Related U.S. patent application Ser. No. 12/126,145, filed May 23, 2008, for "Navigating Among Activities in a Computing Device," and U.S. patent application Ser. No. 12/416,279, filed Apr. 1, 2009, for "Card Metaphor for Activities in a Computing Device," the disclosures of which are incorporated herein, describe various embodiments for running two or more activities concurrently on a computing device, and for interacting with these activities using various modes and user interface paradigms. In one embodiment, the present invention is implemented in conjunction with the various techniques described in these related applications, although one skilled in the art will recognize that the present invention can be implemented in other ways as well.

System Architecture

Figure 11:
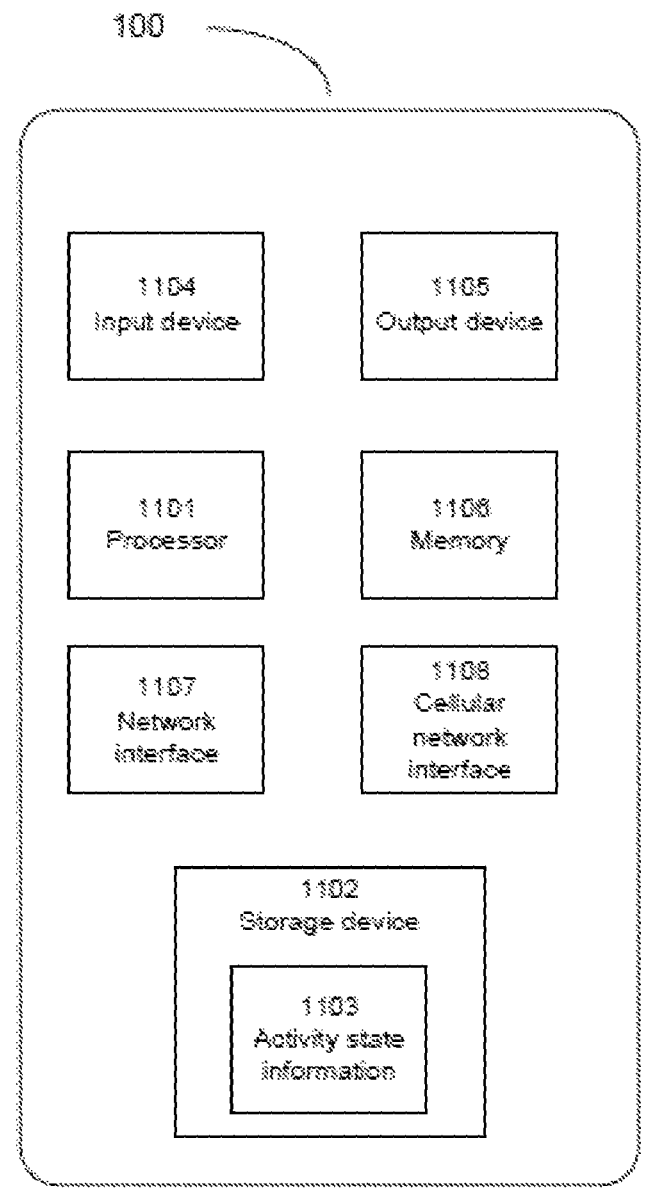
FIG. 11 depicts a functional architecture for implementing the invention according to one embodiment.

Referring now to FIG. 11, there is shown a functional architecture for implementing the invention according to one embodiment. In various embodiments, the present invention can be implemented on any electronic device 100, such as a handheld computer, personal digital assistant (PDA), personal computer, kiosk, cellular telephone, and the like. Device 100 includes a processor 1101 for performing the steps of the invention and for performing other operations related to the operation of device 100, including running software programs and an operating system, and controlling operation of various components of device 100. Device 100 also includes input device 1104 (such as a keyboard, trackball, rocker switch, five-way switch, touch-sensitive pad or screen, or the like), output device 1105 (such as a display screen), and memory 1106. In some embodiments, input device 1104 and output device 1105 are implemented in combination, as for example a touch-sensitive screen enabling direct manipulation of displayed user interface elements.

Device 100 also includes storage device 1102, which may be a hard drive, flash memory, or any other fixed or removable component for data storage. In one embodiment, as discussed in more detail below, the system and method of the present invention store activity state information 1103 in storage device 1102 when activities enter hibernation, and retrieve such state information 1103 from storage device 1102 when reviving activities.

In various embodiments, device 100 can also include additional components, such as, optionally, network interface 1107 (such as Bluetooth and/or wired connectivity to a network such as the Internet), and/or cellular network interface 1108 providing cellular telephony functionality. It is well known to provide such functionality on smartphones.

One skilled in the art will recognize that the functional architecture depicted in FIG. 11 is merely exemplary, and that other arrangements and components can be used for implementing the present invention. The particular components shown in FIG. 11 are not necessary to practicing the invention as claimed herein; some components may be omitted, and others added, without departing from the essential characteristics of the invention as set forth in the claims.

In one embodiment, the invention can be implemented as a feature of an application management paradigm for a software application or operating system running on such a device. Accordingly, certain aspects of the present invention can be implemented as part of a graphical user interface for controlling software on such a device.

In various embodiments, the invention is particularly well-suited to devices 100 such as smartphones, handheld computers, and PDAs, which often have limited resources such as processing power, memory, and network bandwidth, and which are capable of running several software applications concurrently. One skilled in the art will recognize, however, that the invention can be practiced in many other contexts, including any environment in which it may be desirable to provide a mechanism for causing activities to hibernate, whether to conserve system resources, improve system responsiveness, reduce user confusion, or for any other reason. Accordingly, the following description is intended to illustrate the invention by way of example, rather than to limit the scope of the claimed invention.

Figure 1A:
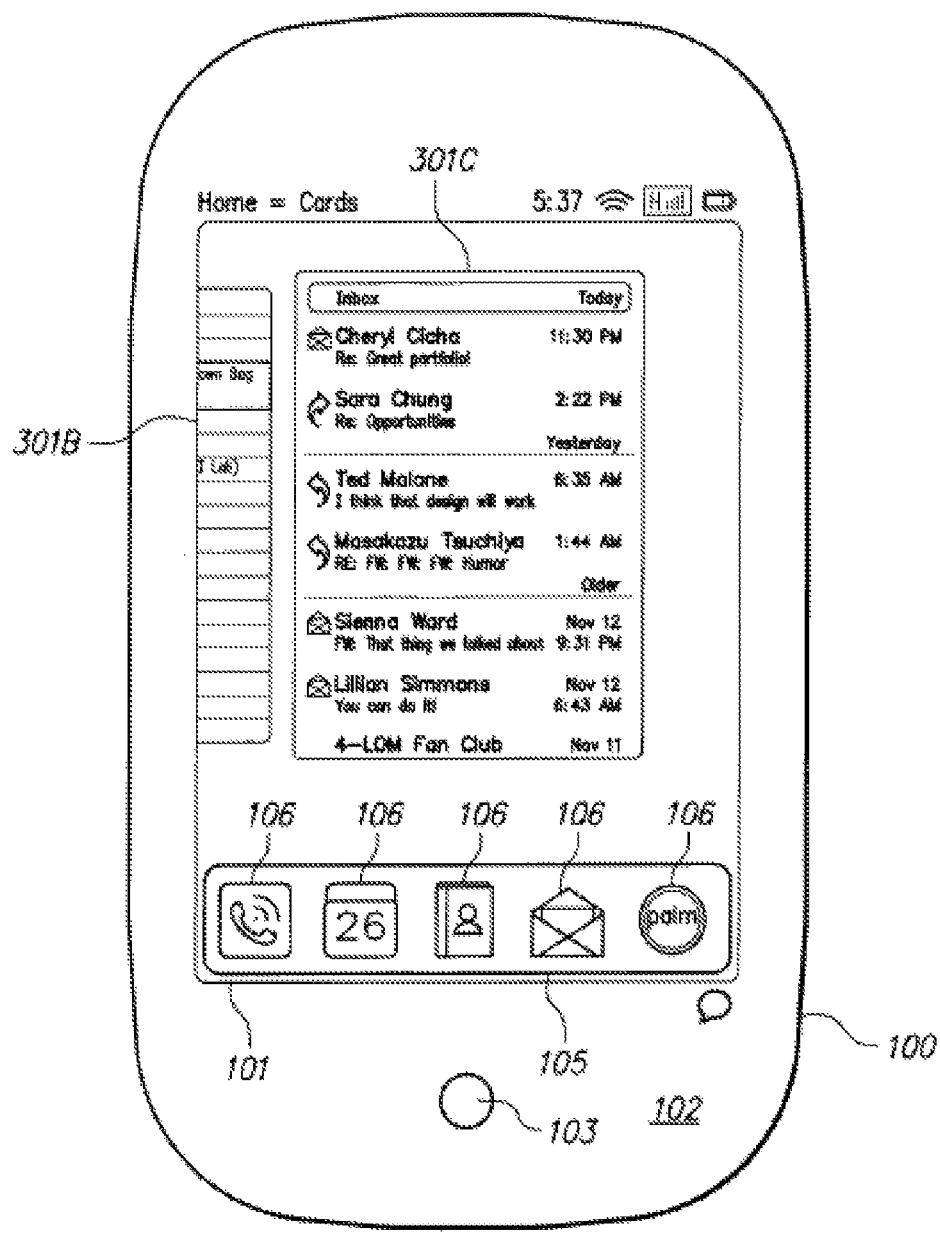
FIG. 1A depicts an example of a display screen in card mode, displaying a card having focus and a partially displayed card, according to one embodiment of the present invention.

Referring now to FIG. 1A, there is shown an example of an example of a device 100 including a display screen 101 displaying multiple activities concurrently using a card metaphor. In this embodiment, activities are associated with cards 301, wherein one or more cards may correspond to a given software application. As described in the above-referenced related patent applications, a user can navigate among activities by moving cards on and off screen 101. In one embodiment, cards 301 retain a persistent positional relationship with one another, and are constrained to move along a single axis (such as horizontally). In one embodiment, various modes are available for viewing and interacting with cards 301 in different ways, as described in the above-referenced related patent applications. The mode depicted in FIG. 1A, wherein a single card 301C is visible in full, with one or two adjacent cards 301B being partially visible, is referred to as a "card mode", although other modes may be available.

In the example of FIG. 1A, display screen 101 also includes a quick-launch area 105, including additional icons 106 for launching commonly used software applications and other activities. Quick-launch area 105 is not necessary for the present invention, but is shown for illustrative purposes only. In one embodiment, as described in more detail below, the system of the present invention causes activities to hibernate in response to certain conditions that may arise when the user attempts to launch an activity.

In one embodiment, screen 101 is touch-sensitive, so that a user can launch a software application, or open a document, or initiate any other activity by touching a displayed icon 106, and can manipulate cards 301 and other displayed objects by touching and/or gesturing in various areas of screen 101. For example, in one embodiment the user can dismiss an application or other activity by dragging its card 301 upward towards the top edge of screen 101. In one embodiment, the user can access open activities whose cards 301 are not currently visible on screen 101, by dragging on-screen cards 301 in a horizontal direction, thus causing off-screen cards 301 to come into view. Details of such operations are described in the related patent applications cited above. One skilled in the art will recognize that the present invention can be implemented in other embodiments wherein screen 101 is not touch-sensitive, and that the techniques described herein are not limited to applicability with any particular input mechanism.

In one embodiment, device 100 also includes a touch-sensitive gesture area 102 for entering gesture-based commands, as described in the above-referenced related patent applications. In another embodiment, screen 101 and/or gesture area 102 is sensitive to user motion in proximity to the surface, so as to detect gestures and commands performed near the surface but without necessarily contacting the surface.

For illustrative purposes, device 100 as shown in FIG. 1A is a personal digital assistant or smartphone. Such devices commonly have telephone, email, and text messaging capability, and may perform other functions including, for example, playing music and/or video, surfing the web, running productivity applications, and the like. The present invention can be implemented, according to various embodiments, in any type of electronic device capable of running multiple software applications concurrently, and is not limited to devices having the listed functionality. In addition, the particular layout and arrangement of various features of device 100 as shown in the Figures are merely exemplary and are not intended to be restrictive of the scope of the claimed invention.

In various embodiments, touch-sensitive screen 101 and gesture area 102 can be implemented using any technology that is capable of detecting a location of contact and/or user motion proximate to the surface. Alternatively, as mentioned above, the present invention can be implemented with other user input mechanisms, such as a keyboard, trackball, stylus, or the like.

In one embodiment, device 100 as shown in FIG. 1 also has a physical button 103. In one embodiment, physical button 103 can be used to toggle between full-screen mode and card mode, as described in the related patent applications. Physical button 103 is not needed for the present invention, and is shown for illustrative purposes only.

Hibernation

In one embodiment of the present invention, device 100 selectively causes activities to hibernate. This can be done automatically, for example in response to certain trigger events or conditions, such as detection of a low-memory condition. Such a condition may occur, for example, when the number of open activities exceeds (or is close to exceeding) device's 100 capabilities, or when the performance, reliability, and/or stability of device 100 is/are in danger of being compromised because of an excess of concurrently running activities. The hibernation can take place automatically, without any user intervention. Alternatively, the user can be prompted to indicate whether to proceed with hibernation, so that hibernation takes place only if the user indicates that it should take place. In one embodiment, a user can manually initiate hibernation of an activity, for example by selecting a "hibernate" button or command.

By providing selective hibernation of activities, the present invention enables implementation of a system wherein a larger number of activities can be opened, and wherein the user is not burdened with repeatedly closing and/or opening activities, and manually restoring state, in order to avoid exceeding limits on system resources. As described in more detail below, hibernating activities can be easily revived as needed, with a minimum of delay and without requiring the user to explicitly relaunch or restore state.

It may also be useful to cause an activity to hibernate for other reasons, such as to simplify operation of device 100, conserve user attention, and/or to enhance security (for example so as to avoid keeping an activity open that might cause device 100 to be vulnerable to unauthorized access over a computer network).

In one embodiment, wherein a software application may have more than one card 301 associated with it, activities associated with individual cards 301 can be placed into hibernation independently of one another. Alternatively, activities for all cards 301 associated with a software application can be placed into hibernation.

In one embodiment, as described in more detail below, when initiating hibernation of an activity, device 100 saves the state of the activity in storage 1102 so that it can later be restored. A snapshot of the activity's user interface is taken. This snapshot, or a portion thereof, or an image derived therefrom, is used to replace the live view presented in the card 301 (or cards 301) corresponding to the activity. In one embodiment, a distinctive visual characteristic or effect is applied to the card 301 corresponding to the activity, so as to inform the user that the activity is hibernating and that the image shown on card 301 is a static snapshot rather than a live presentation of the user interface. In one embodiment, the distinctive visual characteristic is an icon or text indicator; in another embodiment, the image shown in card 301 is grayed-out, shown in black-and-white, or otherwise modified or transformed. In another embodiment, the size, orientation, or other visual characteristic of card 301 is changed to indicate that the activity is hibernating. In another embodiment the image shown in card 301 is darkened or lightened, for example by applying a transparent grayscale overlay, referred to as a "scrim", atop on the image shown in card 301. In one embodiment, the scrim is applied by the operating system of device 100 when card 301 is being displayed; thus, display 101 shows the snapshot for card 301 with the scrim applied. In another embodiment, the scrim is applied at the time the snapshot is made, so that the snapshot image itself incorporates the scrim, and no additional processing need be applied when displaying the snapshot.

In one embodiment, the snapshot is taken at a relatively high level of resolution so that it can be scaled as appropriate depending on the current displayed size of the associated card 301. In one embodiment, the snapshot occupies the card 301 associated with the hibernating activity. In another embodiment, some animation is introduced, for example to emphasize the fact that the activity is hibernating. In yet another embodiment, hibernating activities are represented in some other manner, such as a generic image or textual indicator, rather than being represented by a snapshot of the user interface.

Figure 1B:
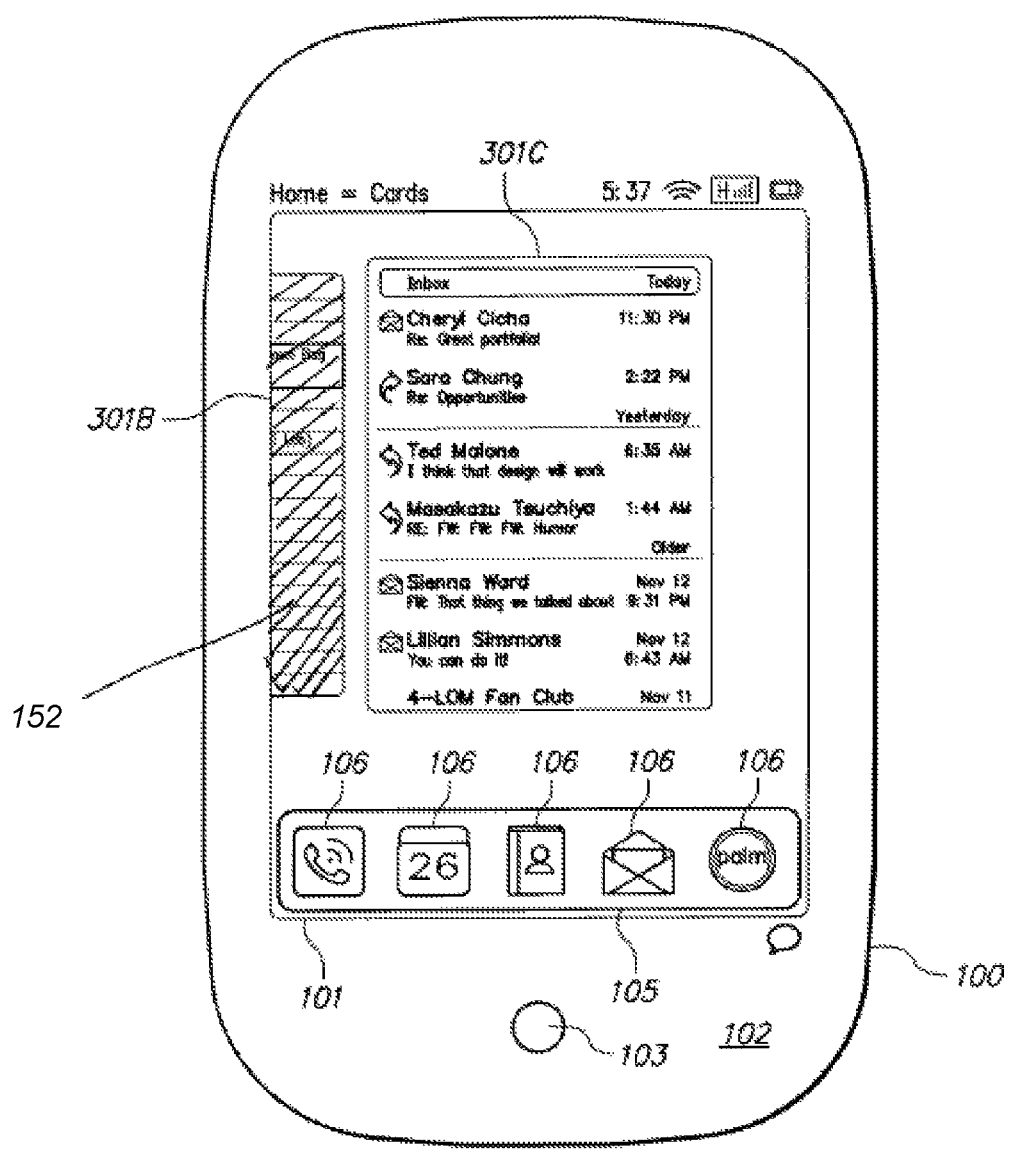
FIG. 1B depicts the display screen in card mode, wherein an activity is hibernating.

Referring now to FIG. 1B, there is shown display screen 101 in card mode, wherein the activity represented by card 301B is hibernating. A scrim has been applied to card 301B. The scrim is represented in the Figure by diagonal lines; however, it can take any visual form, including for example an overall darkening of the image associated with card 301B.

In the example of FIG. 1B, the image shown in card 301B is a static snapshot 152 rather than a live user interface, since the activity associated with card 301B is not currently running. Other, live activities, such as that represented by card 301C, are represented by a live user interface with which the user can interact.

In one embodiment, cards 301 for hibernating activities maintain their positions with respect to cards 301 for live activities. In other embodiments, cards 301 are repositioned within the sequence when their activities hibernate, for example by being grouped with one another, or moved to the end of the sequence of cards 301, or otherwise repositioned to indicate the hibernation state.

Cards 301 for hibernating activities can be moved, repositioned, and otherwise manipulated in the same manner as cards 301 for live activities, although cards 301 for hibernating activities are occupied by static snapshots of their respective user interfaces. Thus, in one embodiment, the various techniques for interacting with cards 301, as described in the above-referenced related patent applications, can all be applied to cards 301 for hibernating activities. As will be described in more detail below, certain actions performed by the user may cause a hibernating activity to be revived.

Referring now to FIG. 10, there is shown display screen 101 in card mode, wherein card 301B for the hibernating activity has been moved to the center position on screen 101. In one embodiment, the activity remains in the hibernation state regardless of its position on screen 101; thus, static snapshot 152 is displayed with an overlaid scrim represented here by diagonal lines. Cards 301A and 301C, both representing live activities, are partially visible on either side of card 301B. In some embodiments, placing a card 301 in the center position causes its activity to revive. In other embodiments, revival takes place after card 301 has occupied the center position for some period of time.

Figure 4:
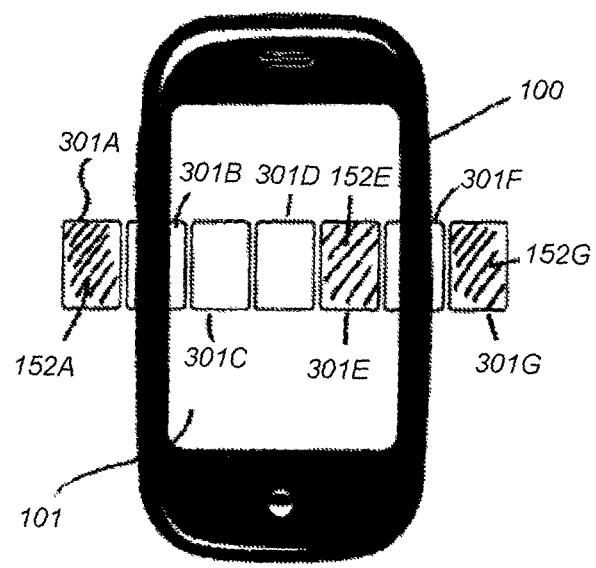
FIG. 4 depicts a display screen in shuffle mode, wherein some activities are hibernating, according to one embodiment.

In one embodiment, cards 301 for hibernating activities can be displayed in other modes as well. Referring now to FIG. 4, there is shown an example of display screen 101 in a "shuffle" mode, in which cards 301 are presented at a reduced size with respect to card mode, so that more than one card 301 can be presented in full.

As described in the above-referenced related patent applications, shuffle mode is optimized for reordering and manipulating cards 301 representing activities. In one embodiment, in shuffle mode, cards 301 are shown at a reduced size, thus permitting more cards 301 to be shown on screen 101 simultaneously. In one embodiment, when device 100 is in shuffle mode, cards 301 are arranged linearly as they are in card mode. The user can rearrange cards 301 as described above for card mode, and substantially all of the behaviors described above with respect to card mode also apply to shuffle mode. Thus, when the user drags a card 301 to the left or right within display screen 100, other cards 301 move in concert with the dragged card 301. Shuffle mode provides a way to rearrange cards while being able to view more cards 301 simultaneously.

As shown in FIG. 4, in one embodiment three cards 301C, 301D, 301E are displayed in full, and portions of two other cards 301B, 301F are displayed. Cards 301A and 301G are shown in FIG. 4 for illustrative purposes to depict their positional relationship with visible cards 301C, 301D, 301E, even though cards 301A and 301G are off-screen and not currently visible on screen 101.

In the example of FIG. 4, activities corresponding to cards 301A, 301E, and 301G are hibernating. Accordingly, static snapshots 152A, 152E, and 152G are displayed, respectively, within cards 301A, 301E, and 301G, replacing the live user interface for those cards. In one embodiment, cards 301A, 301E, and 301G are overlaid by scrims to indicate the hibernation state. Alternatively, as described above, other mechanisms can be used to indicate the hibernation state.

Figure 5:
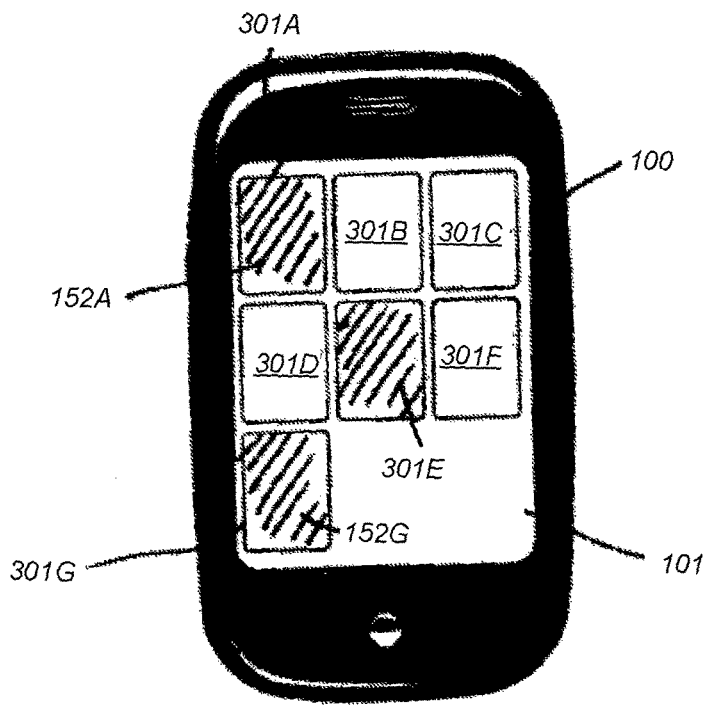
FIG. 5 depicts a display screen in grid mode, wherein some activities are hibernating, according to one embodiment.

Referring now to FIG. 5, there is shown an example of display screen 101 in a "grid" mode, in which card size is reduced according to available screen space. In one embodiment, grid mode allows a user to see more cards 301 on screen 101 by presenting cards 301 in a two-dimensional grid.

As described in the above-referenced related patent applications, in grid mode, cards 301 are presented at a size that permits all cards 301 to be displayed simultaneously. Thus, for example, in FIG. 5, cards 301 are shown at a size that permits all seven open cards 301 to be shown simultaneously. As cards 301 are dismissed or launched, cards 301 can be scaled appropriately to permit all cards 301 to be displayed simultaneously.

As described in the above-referenced related patent applications, in one embodiment, in grid mode, a minimum card 301 size (or a maximum number of displayed cards 301) is enforced, even if this means that only a subset of cards 301 can be displayed. Thus, in effect, once cards 301 have been scaled down to the minimum size (or once the maximum number of displayed cards 301 is shown on screen 101), no further downward scaling takes place. Rather, scrolling is permitted to allow the user to access remaining non-displayed cards 301. Some visual indication can be provided to inform the user that additional cards 301 can be accessed via scrolling, for example by showing the edges of cards 301 that are off-screen. The user can scroll, for example, by moving cards 301 to the left or right, or performing a gesture in gesture area 102, or by any other known means.

In the example of FIG. 5, in one embodiment cards 301A to 301G are displayed in full while device 100 is in grid mode. Activities corresponding to cards 301A, 301E, and 301G are hibernating. Accordingly, static snapshots 152A, 152E, and 152G are displayed, respectively, within cards 301A, 301E, and 301G, replacing the live user interface for those cards. In one embodiment, cards 301A, 301E, and 301G overlaid by scrims to indicate the hibernation state. Alternatively, as described above, other mechanisms can be used to indicate the hibernation state.

In one embodiment, as described in the above-referenced related patent applications, cards 301 can be visually grouped with one another. Thus, cards 301 having some relationship to one another (such as cards 301 associated with a particular software application) can be displayed in a manner that indicates and/or reinforces the relationship. For example, cards 301 representing various web pages being viewed via a browser application can be grouped.

In one embodiment, if a software application associated with a group of cards 301 is hibernating, all cards 301 in the group are shown with static snapshots 152 and scrims.

Figure 6A:
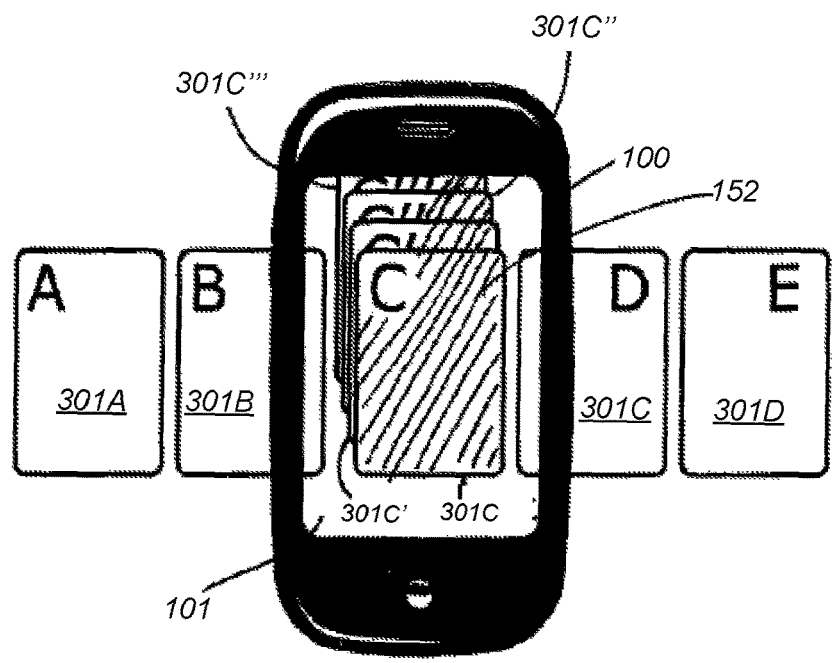
FIG. 6A depicts a display screen in card mode, wherein an activity associated with a group of cards is hibernating, according to one embodiment.

For example, one visual paradigm for indicating groups of cards 301 is to depict the cards 301 in a manner that resembles a stack or deck, with a fully-visible front card 301 (or "top card") and one or more additional cards 301 depicted as though they are behind the front card 301. Referring now to FIG. 6A, there is shown an example of such a paradigm for indicating groups of cards 301 in card mode, wherein eight cards 301A, 301B, 301C, 301C', 301C", 301C''', 301D, and 301E are open, and card 301C currently is in the focus position (center of screen 101). Cards 301C, 301C', 301C'', and 301C''' form a card group, for example by virtue of the fact that they are all associated with a common software application; therefore they are depicted in a stack. In the example, the software application associated with the card group is hibernating; therefore, cards 301C, 301C', 301C'', and 301C''' contain static snapshots 152 of their respective user interfaces, and are overlaid by scrims. For some of the cards 301, only a portion of the static snapshot 152 is visible because the card 301 is depicted as being behind other cards 301.

Figure 6B:
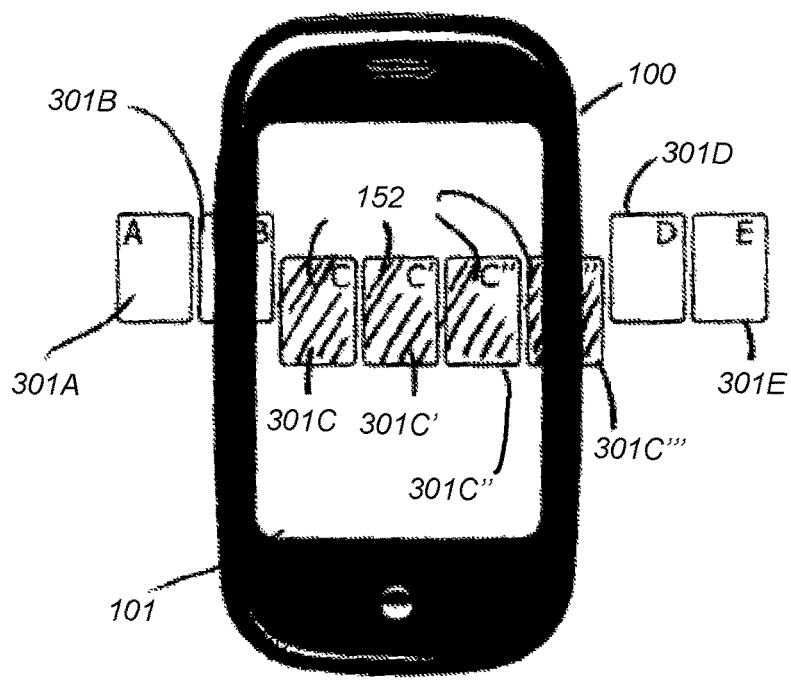
FIG. 6B depicts a display screen in shuffle mode, wherein an activity associated with a group of cards is hibernating, according to one embodiment.

Another example of a visual paradigm for indicating groups of cards 301 is to depict the grouped cards 301 at a different size or vertical offset with respect to other cards 301. Referring now to FIG. 6B, there is shown an example of such a paradigm for indicating groups of cards 301 in shuffle mode, wherein eight cards 301A, 301B, 301C, 301C', 301C'', 301C''', 301D, and 301E are open. Cards 301C, 301C', 301C'', and 301C''' form a card group, for example by virtue of the fact that they are all associated with a common software application; therefore they are depicted at a different vertical offset than other cards 301A, 301B, 301D, 301E. In the example, the software application associated with the card group is hibernating; therefore, cards 301C, 301C', 301C'', and 301C''' contain static snapshots 152 of their respective user interfaces, and are overlaid by scrims.

Revival

In one embodiment, a hibernating activity is revived when a user attempts to interact with it. As described in the above-referenced related patent applications, if a user taps or clicks on card 301 for an activity, that activity is given focus; in one embodiment, device 100 switches to a full-screen mode wherein the user can interact with the activity. In one embodiment, if the user taps or clicks on card 301 for a hibernating activity, the activity is automatically revived so that the user can interact with it. In one embodiment, the user is first prompted, for example via a dialog box (not shown) asking whether the selected activity should be revived. In another embodiment, the activity is revived without first prompting the user.

Revival of one or more activities can take place in any display mode, whether card mode, full-screen mode, shuffle mode, grid mode, or any other mode. According to various embodiments of the invention, different types of trigger events might cause an activity to be revived. In one embodiment, switching from one mode to another can trigger revival; in other embodiments, incoming communications, alerts, attempts by the user to perform certain actions, and/or other events can trigger revival of one or more activities. In some embodiments, placing a card 301 in the center position causes its activity to revive. In other embodiments, revival takes place after card 301 has occupied the center position for some period of time.

Figure 1C:
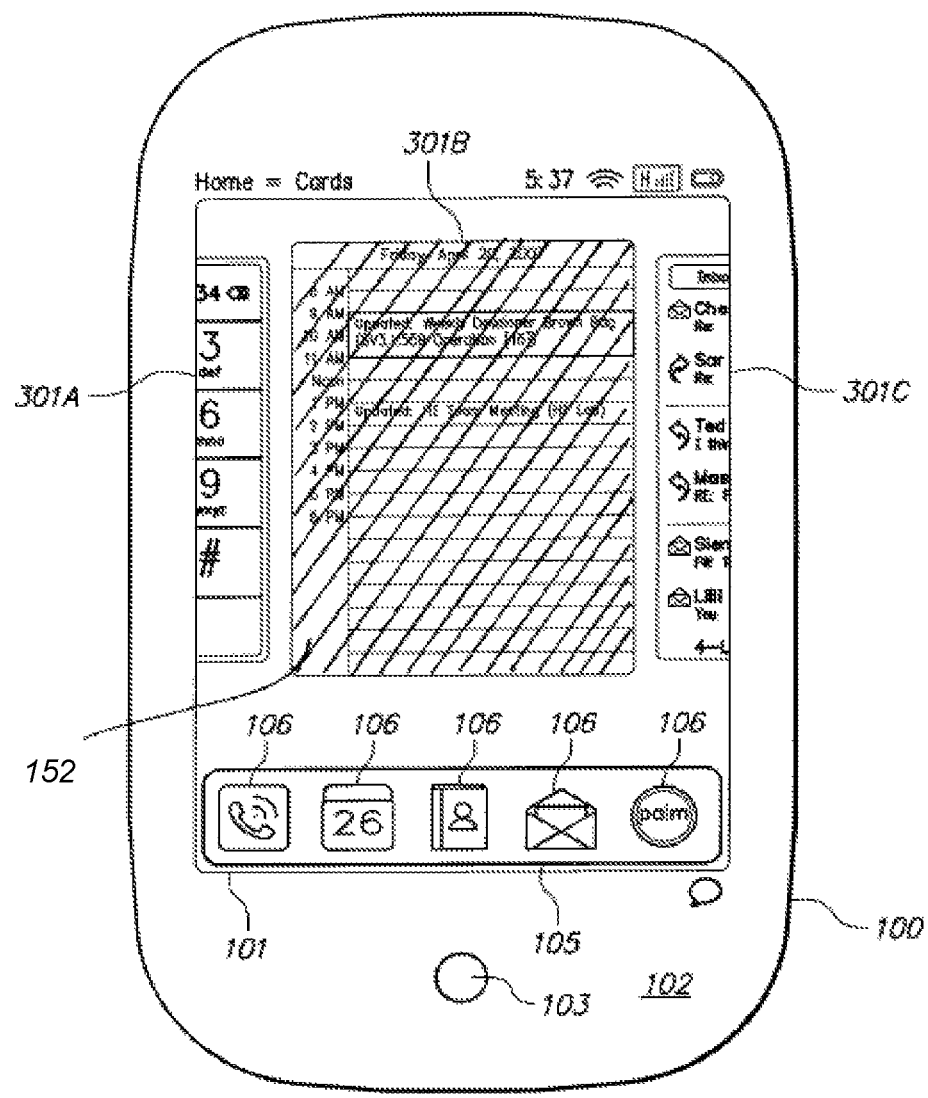
FIG. 1C depicts the display screen in card mode, wherein the card for the hibernating activity is in a center position on the screen.
Figure 1D:
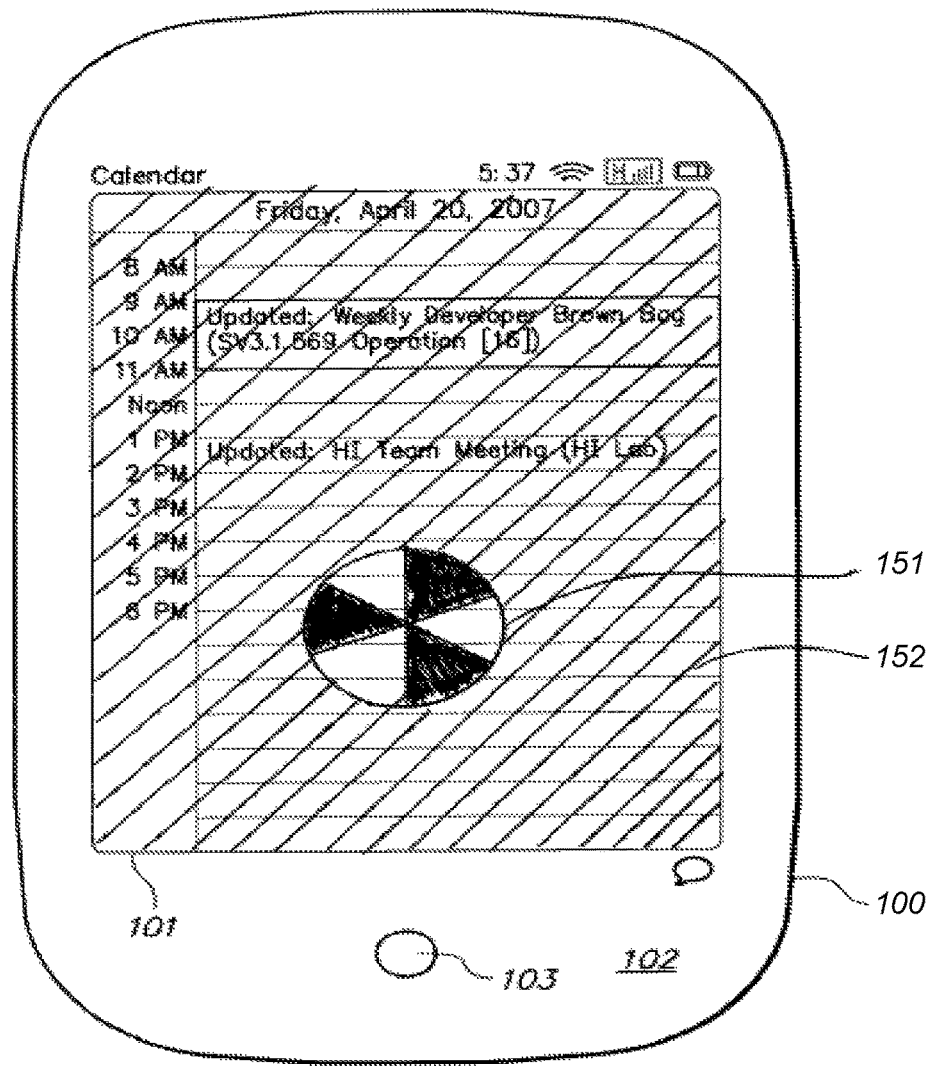
FIG. 1D depicts the display screen in full-screen mode, wherein the hibernating activity is being revived.

In some cases, it may take time for an activity to be revived, as data from activity state information 1103 is being retrieved and the activity is re-launched. Referring now to FIG. 1D, there is shown an example of display screen 101 in full-screen mode, while the hibernating activity represented by card 301B of FIG. 1C is being revived. This may occur, for example, if user taps on card 301B of FIG. 1C. In one embodiment, device 100 launches the hibernating activity, retrieves state information 1103, and restores the activity to its state at the time it went into hibernation. In one embodiment, while the revival is taking place, the static snapshot 152 is enlarged to fill screen 101, and progress indicator 151 is shown. In the example of FIG. 1D, progress indicator 151 is shown as a spinning wheel; however, one skilled in the art will recognize that any other progress indicator 151 can be used, such as a status bar, hourglass, clock icon, or the like. Progress indicator 151 can be static or animated.

Once revival is complete, static snapshot 152 is replaced by a live user interface for the activity, and the scrim (or other visual indication of hibernation state) is dismissed. In one embodiment, a visual transition effect, such as a dissolve effect, is performed between display of the static snapshot 152 and display of the live user interface. Once the revival process is complete, progress indicator 151 is dismissed.

Figure 1E:
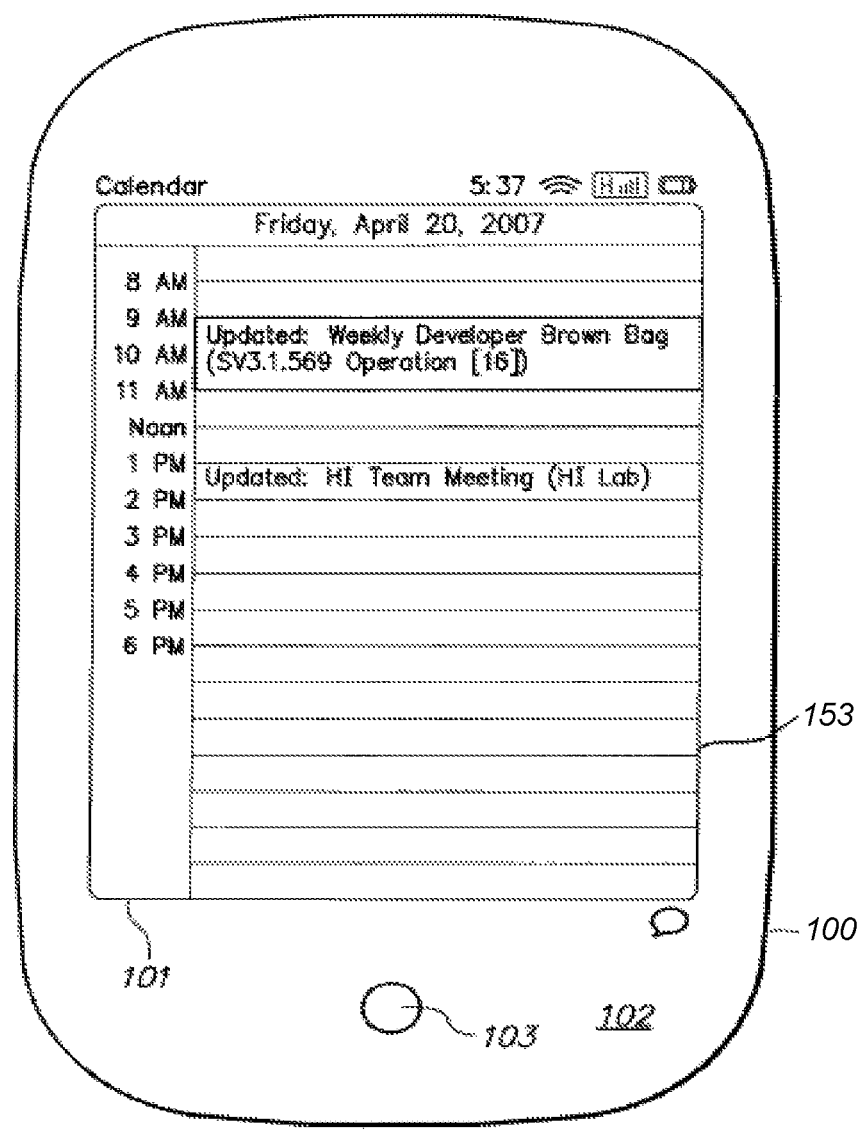
FIG. 1E depicts the display screen in full-screen mode, wherein the previously hibernating activity has been revived.

Referring now to FIG. 1E, there is shown an example of display screen 101 in full-screen mode after the revival process is complete. The previously hibernating activity has been revived, the scrim and progress indicator 151 have been removed, and a live user interface 153 for the activity is presented in lieu of static snapshot 152.

Figure 3A:
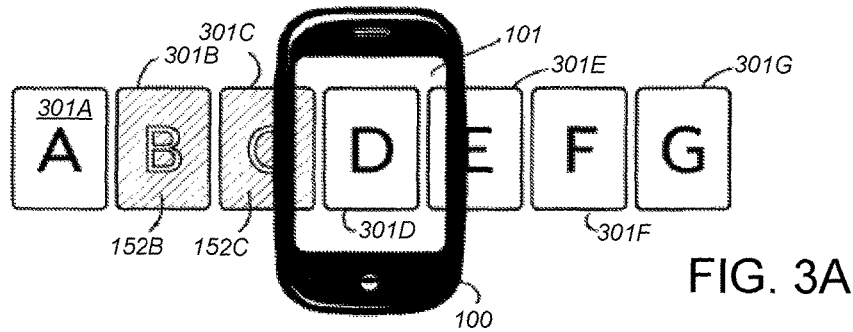
FIGS. 3A through 3D are a series of conceptual illustrations displaying a sequence for reviving a hibernating activity according to one embodiment.

Referring now to FIGS. 3A through 3D, there is shown a series of conceptual illustrations displaying a sequence for reviving a hibernating activity according to one embodiment. In FIG. 3A, seven cards 301A-301G are open, with five cards 301A, 301D, 301E, 301F, 301G representing live activities with which the user can interact, and two cards 301B, 301C representing hibernating activities. Static snapshots 152B, 152C are presented in cards 301B, 301C, respectively, to replace the live user interfaces for those cards 301B, 301C. A scrim, represented by diagonal lines, overlays static snapshots 152B, 152C. State information 1103 for the hibernating activities has been stored in storage device 1102 of device 100.

FIGS. 3A through 3D are conceptual illustrations, in that they depict cards 301 that are not currently displayed on screen 101. For example, in FIG. 3A, card 301D is displayed in full, while portions of cards 301C and 301E are displayed. Other cards 301 are shown for illustrative purposes to depict their positional relationship with visible cards, even though these other cards 301 are off-screen and not currently visible on screen 101. As described in the above-reference related patent applications, the user can interact with device 100 to cause other cards 301A, 301B, 301F, 301G to be displayed, and to shift the positions of cards 301 and/or otherwise interact with cards 301.

Figure 3B:
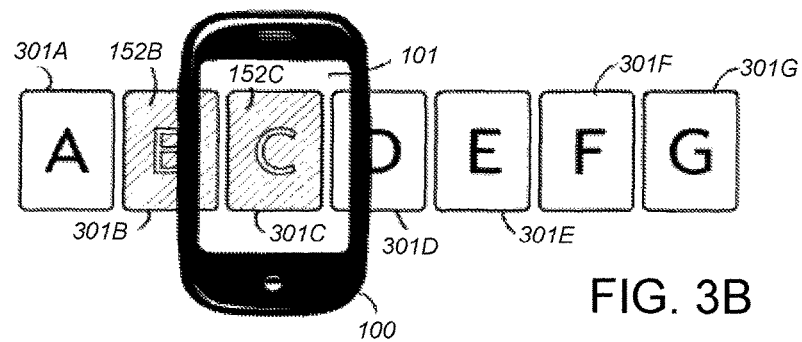
Figure 3C:
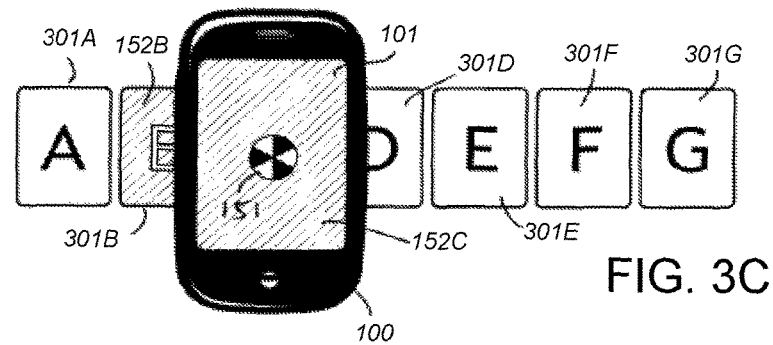
Figure 3D:
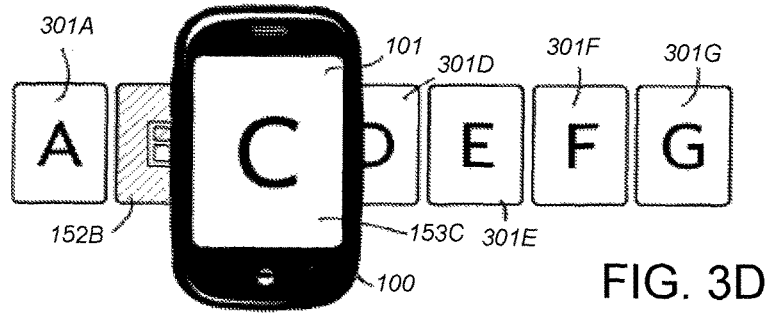

In one embodiment, a hibernating activity is revived when the user attempts to interact with the associated card 301 (other than to reposition or dismiss card 301). For example, if the user switches to full-screen mode while a card 301 for a hibernating activity is in the focus position (center position) on screen 101, in one embodiment the activity will automatically be revived. FIGS. 3B through 3D show an example of such a process.

In FIG. 3B, the user has shifted the positions of cards 301 so that card 301C is now in the center (focus) position on screen 101.

In FIG. 3C, the user has caused screen 101 to change to full-screen mode, for example by tapping on card 301C or otherwise indicating that he or she wishes to interact with card 301C. Accordingly, static snapshot 152C associated with card 301C now occupies substantially the entire screen 101 (although in some embodiments, some portion of screen 101 may be dedicated to status indicators and other information, not shown in FIG. 3C). Static snapshot 152C is scaled up to fit the displayed area. While the activity is re-launched and state information 1103 retrieved from storage device 1102, progress indicator 151 is shown. In one embodiment, progress indicator 151 may include animation, and may take any form; the spinning wheel shown in FIG. 3C is merely an example.

In FIG. 3D, the revival process is complete and display screen 101 is in full-screen mode. The previously hibernating activity has been revived, the scrim and progress indicator 151 have been removed, and a live user interface 153C for the activity is presented in lieu of static snapshot 152C. As mentioned above, a transition effect, such as a dissolve effect, can be used to smooth the transition from FIG. 3C to FIG. 3D.

Trigger Events

According to various embodiments of the present invention, hibernation of activities can be initiated in response to any of a number of different trigger events. In one embodiment, hibernation is initiated when a low-memory condition is detected. In other embodiments, hibernation is initiated when a determination is made that performance, reliability, and/or stability of device 100 may be compromised by depletion or overtaxing of system resources such as memory, processor speed, network bandwidth, or the like. Such conditions may occur, for example, when too many activities are open concurrently, or when some or all of the open activities consume an inordinately large fraction of available system resources.

In one embodiment, an attempt to launch a new activity can trigger hibernation of an already-open activity. For example, if the newly launched activity cannot be launched without first freeing up some system resources, or if the newly launched activity cannot be added to the set of currently open activities without detrimental effect to system performance, then hibernation of a previously open activity may be automatically initiated in response to the attempted launch of the new activity.

Figure 2A:
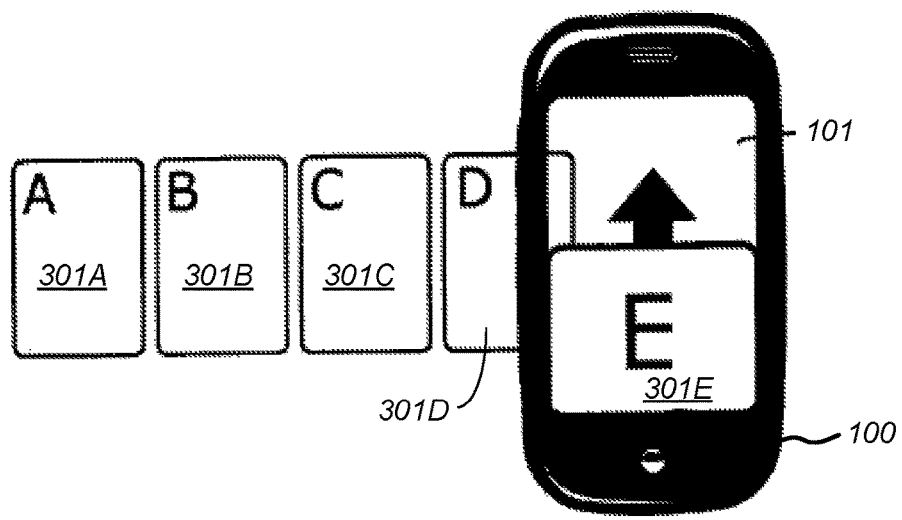
FIGS. 2A through 2B are a conceptual illustration displaying a sequence wherein launch of a first activity causes a second activity to hibernate, according to one embodiment.
Figure 2B:
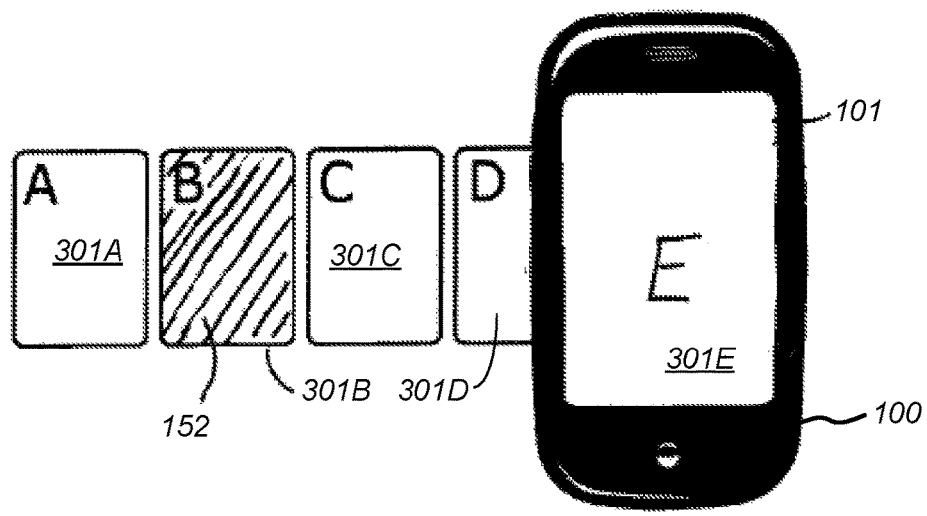

Referring now to FIGS. 2A and 2B, there is shown a conceptual illustration displaying a sequence wherein launch of a first activity causes a second activity to hibernate. In FIG. 2A, a number of activities are open, each represented by a card 301A through 301D arranged in a row. Cards 301A through 301D represent user interface views for the open activities that can be moved onto display screen 101 in response to user commands. In FIG. 2A, the user is launching a new activity represented by card 301E. Card 301E is being introduced at a position in the row to the right of card 301D. Cards 301A, 301B, and 301C are shown in FIGS. 2A and 2B for illustrative purposes to depict their positional relationship with visible cards 301D and 301E, even though cards 301A, 301B, and 301C are off-screen and not currently visible on screen 101.

In this example, the system determines that launching the new activity will result in a low-memory condition or other overburdening of system resources. Accordingly, device 101 causes one of the open activities to hibernate, thus freeing up system resources and allowing the new activity to be launched. As shown in FIG. 2B, card 301B is overlaid with a scrim, and the user interface presented therein is replaced by a static screenshot representing the state of the associated activity. The new activity has been launched in full-screen mode, so that new card 301E occupies entire screen 101.

Particular techniques for determining which activity should be selected for hibernation are discussed in more detail below.

In some embodiments, where a software application may be associated with two or more cards 301, cards 301 can hibernate and/or be revived independently of one another. Thus, a card 301 associated with a software application may be selected for hibernation while another card 301 for the same software application remains live. Conversely, a hibernating card 301 associated with a software application may be revived while another card 301 for the same software application remains in hibernation.

In other embodiments, a software application may be selected for hibernation, so that all cards 301 associated with that software application hibernate in concert with one another. Conversely, when the software application is being revived, all cards 301 associated with that software application are revived in concert with one another.

Method

Figure 7:
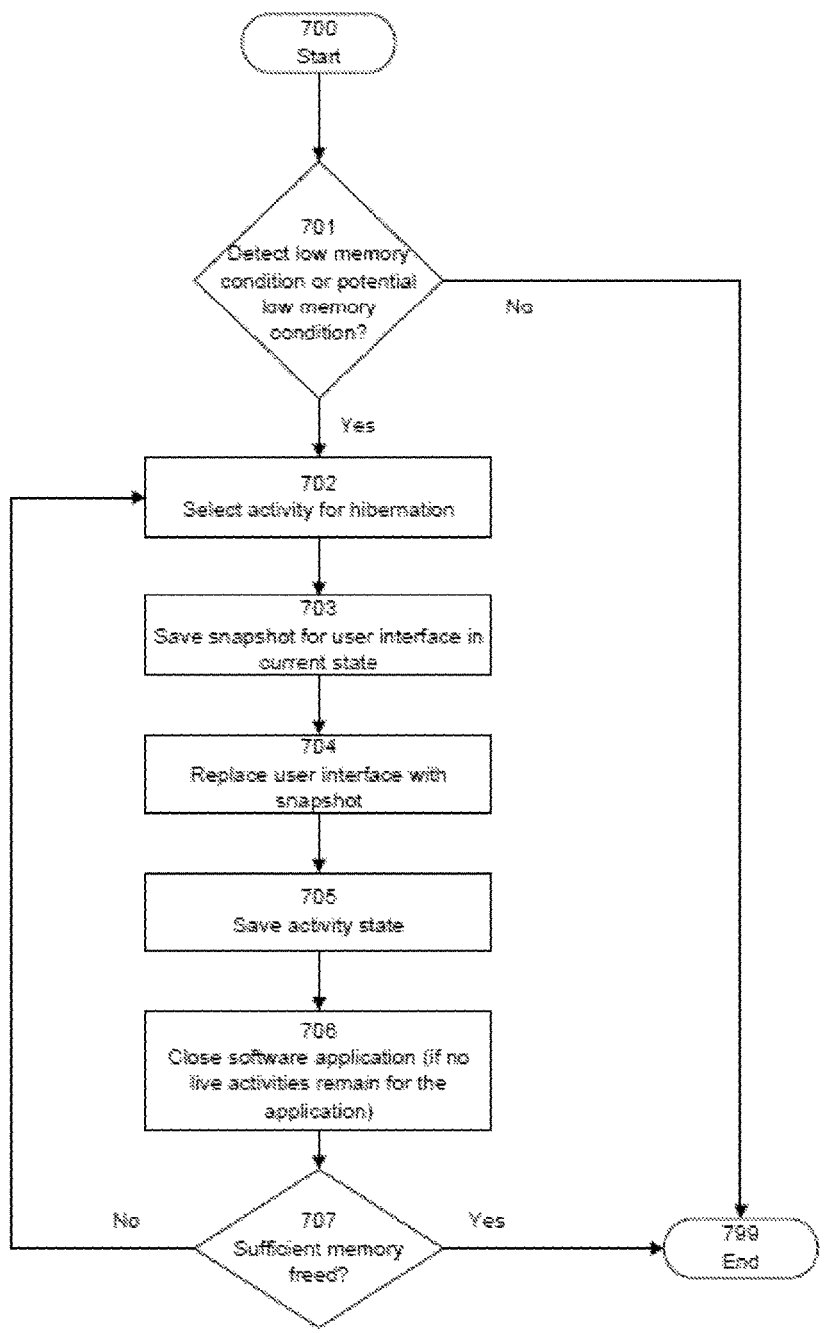
FIG. 7 is a flow diagram depicting a method for causing one or more activities to hibernate according to one embodiment.

Referring now to FIG. 7, there is shown a flow diagram depicting a method for causing one or more activities to hibernate according to one embodiment.

In one embodiment, processor 1101 on device 100 detects 701 a low memory condition or potential low memory condition. In other embodiments, other events can trigger hibernation, such as detection that some fixed limit on open activities has been reached, or that some activities have been open without being used by the user for some period of time, or any other trigger event. If no such trigger event or condition has taken place, the method ends 799.

Processor 1101 selects 702 an activity (or more than one activity) for hibernation. The selection 702 can be made based on any factor or combination of factors, including memory usage, perceived importance of the activity, time since the activity was last viewed or used by the user, or the like.

In one embodiment, a priority order is established in order to determine which categories of activities should be placed into hibernation first. An example of such a priority order is as follows (from first to be placed into hibernation to last):
web browser;
other activities not directly associated with communication with other parties;
messaging application;
email application;
telephone application.

In one embodiment, the telephone application is not placed into hibernation if an active call is in progress.

In one embodiment, processor 1101 selects 702 an activity for hibernation according to the priority list. If hibernation of the selected activity is insufficient to resolve the low-memory condition (or whatever condition triggered the hibernation operation), another activity is selected. The process is repeated until the condition that triggered hibernation has been resolved.

In one embodiment, where a software application may have more than one card 301 associated with it, individual cards 301 can be placed into hibernation independently of one another. Thus, processor 1101 selects 702, for hibernation, an individual card 301 associated with a software application according to the priority list. In one embodiment, processor 1101 selects the card 301 occupying the most memory, or consuming the most system resources among those cards associated with the selected software application. In another embodiment, some other criterion (or more than one criteria) can be used for selecting an individual card 301 for hibernation. If hibernation of the activity associated with the selected card 301 is insufficient to resolve the low-memory condition (or whatever condition triggered the hibernation operation), another card 301 for that software application is selected. The process is repeated until the condition that triggered hibernation has been resolved.

Thus, in one embodiment, successive cards 301 for a given software application are selected for hibernation before cards 301 for a different software application are selected for hibernation. In another embodiment, cards 301 are selected based on the amount of memory or other resources they consume, regardless of which software application they are associated with. Thus, in this second embodiment, it is not necessary for all cards 301 for a given software application to be selected for hibernation before cards 301 for a different software application are selected.

In other embodiments, other criteria can be employed for selecting 702 activities for hibernation. Selection can be based on any of the following, alone or in any combination:

Which activity is using the most memory;
Which activity is using the most system resources;
Which activity is using the most memory but is not currently in focus (active use);
Which activity is using the most system resources but is not currently in focus (active use);
Which activity is using the most memory but is not currently visible on screen 101;
Which activity is using the most system resources but is not currently visible on screen 101;
Which activity was least recently used or viewed by the user;
Which activity was least recently launched;
Which activity has been designated by the user as being appropriate for hibernation.

In one embodiment, a heuristic may be employed, including a combination of any or all of the above factors. One skilled in the art will recognize that the above list is merely exemplary, and that other factors may be employed.

FIG. 7 depicts additional details for the hibernation process according to one embodiment. A snapshot is taken and saved 703 of the user interface associated with the activity to be placed into hibernation. The user interface or card 301 contents are replaced 704 with the snapshot. As discussed above, the snapshot can be a static image or it can be animated. A scrim can be overlaid on the snapshot, and/or some other indication of hibernation state can be applied. In one embodiment, a transition effect can be employed while the scrim is overlaid.

Processor 1101 saves 705 activity state information 1103 in storage device 1102. If one or more individual cards 301 for a software application are being placed into hibernation, in one embodiment the state for those card(s) 301 is stored. In one embodiment, if no activities remain live for a software application, the software application is closed 706 so as to free up resources for other activities.

Processor 1101 determines 707 whether sufficient memory has been freed (or whatever condition triggered the hibernation operation has been resolved). If so, the process ends 799. Otherwise, processor returns to step 702 to select another activity for hibernation.

Figure 8:
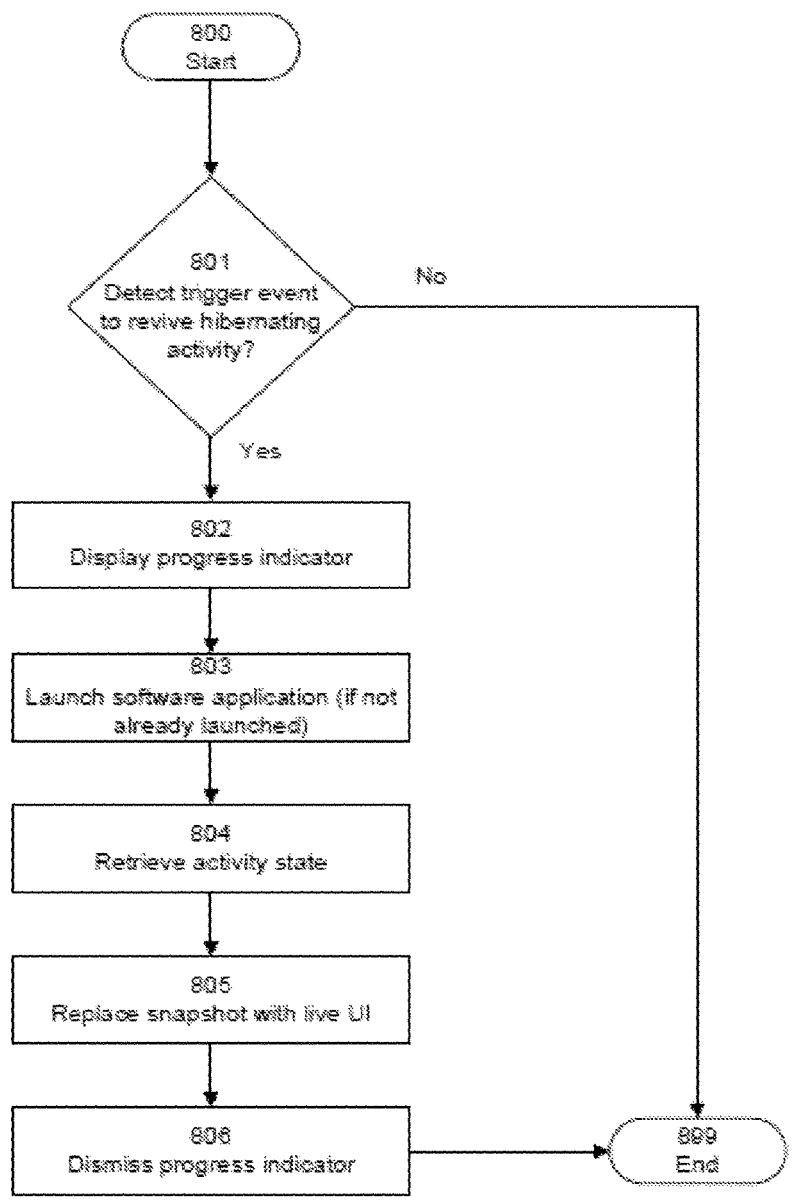
FIG. 8 is a flow diagram depicting a method for reviving a hibernating activity according to one embodiment.

Referring now to FIG. 8, there is shown a flow diagram depicting a method for reviving a hibernating activity according to one embodiment. Processor 801 detects a trigger event for reviving a hibernating activity. In one embodiment, a user attempting to interact with a card 301 is such a trigger event. In other embodiments, other trigger events may apply, such as an explicit command from the user to revive an activity, or a change to full-screen mode while a card 301 is in a focus position. If no trigger event is detected 801, the method ends 899.

In one embodiment, while the activity is being revived, display screen 101 displays progress indicator 151. The activity being revived is launched 803, if it has not already been launched. In one embodiment, where an individual card 301 is being revived, the software application associated with the card 301 may already be live because other cards 301 exist and are live for the software application. Thus, it may not be necessary to launch the software application. Processor 1101 retrieves 804 activity state information 1103 from storage device 1102, so as to restore the state of the activity. The snapshot for card 301 is replaced 805 with the appropriate live user interface; any scrim or other indicator of hibernation state is dismissed. In one embodiment, a transition effect can be employed while the live user interface is introduced and the scrim or other indicator dismissed. Once the activity is fully revived, progress indicator 151 is dismissed 806, and the method ends 899.

User Notification

As described above, in one embodiment, activities are placed into hibernation automatically in response to certain trigger events. In other embodiments, the user may be prompted to indicate whether activities should be placed into hibernation.

In some embodiments, when resources (such as memory 1106) of device 100 are low, and activities are in hibernation, it may be desirable to prevent or limit the launch of new activities. Thus, if the user attempts to launch a new activity under such conditions, the user can be prompted to dismiss activities in order to free up resources for new activities. Such a prompt may also be appropriate when a new activity would otherwise be automatically launched, such as to display a new incoming email message or for any other reason.

Figure 9:
FIG. 9 depicts an example of a display screen showing a low-memory warning, according to one embodiment.

Referring now to FIG. 9, there is shown an example of a display screen showing a low-memory warning, according to one embodiment. As shown in FIG. 9, a low memory message 901 is presented, prompting the user to throw away (dismiss) cards 301 to free up memory for new cards. Message 901 can thereby give the user an opportunity to avoid unwanted hibernation of activities by dismissing cards 301 representing unneeded activities. The user can activate the OK button 902 to indicate that he or she is done dismissing cards 301 representing activities.

In one embodiment, a visual indicator can be provided to indicate to the user that an activity is potentially subject to hibernation should the need arise, or that hibernation is imminent. For example, a visual indicator can be presented to inform the user that, should hibernation be deemed necessary or advisable, a particular activity (such as one that is low-priority or has not recently been used by the user) is likely to be selected. An example of such an indicator is a visual depiction of decay, for example superimposed on the user interface for the card 301.

In one embodiment, under certain conditions, hibernating activities can be dismissed entirely. For example, in one embodiment, if device 100 is turned off, or enters a sleep state, hibernating activities are dismissed, and their state information 1103 is discarded from storage device 1102. In one embodiment, any open documents associated with the hibernating activities are saved. In one embodiment, a notification can be presented to inform the user that these activities are to be (or have been) dismissed.

In one embodiment, hibernation is implemented as a prelude to dismissal. Thus, a two-stage process is employed, wherein activities are placed into hibernation to conserve system resources; then, after some period of time, if the hibernating activities are not revived, they are dismissed.

Desktop Metaphor

Figure 10A:
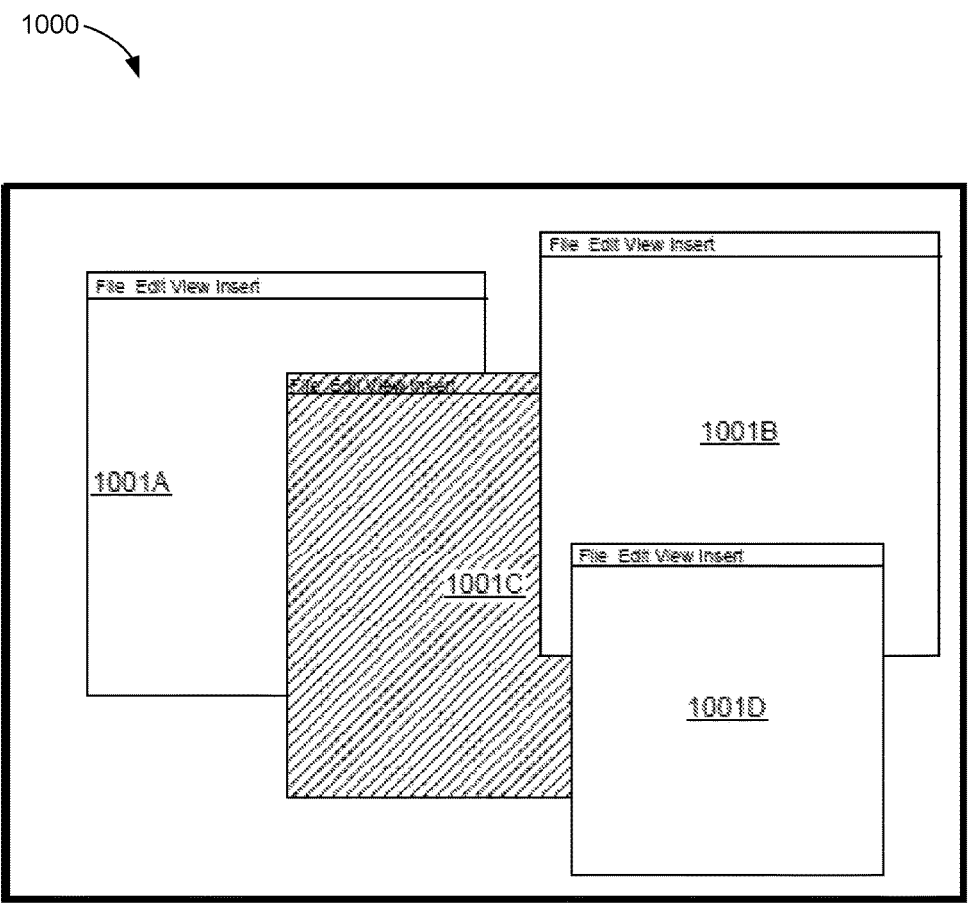
FIG. 10A depicts an example of a display screen for an alternative embodiment of the invention using a desktop user interface having overlapping windows, wherein an activity is hibernating, according to one embodiment.
Figure 10B:
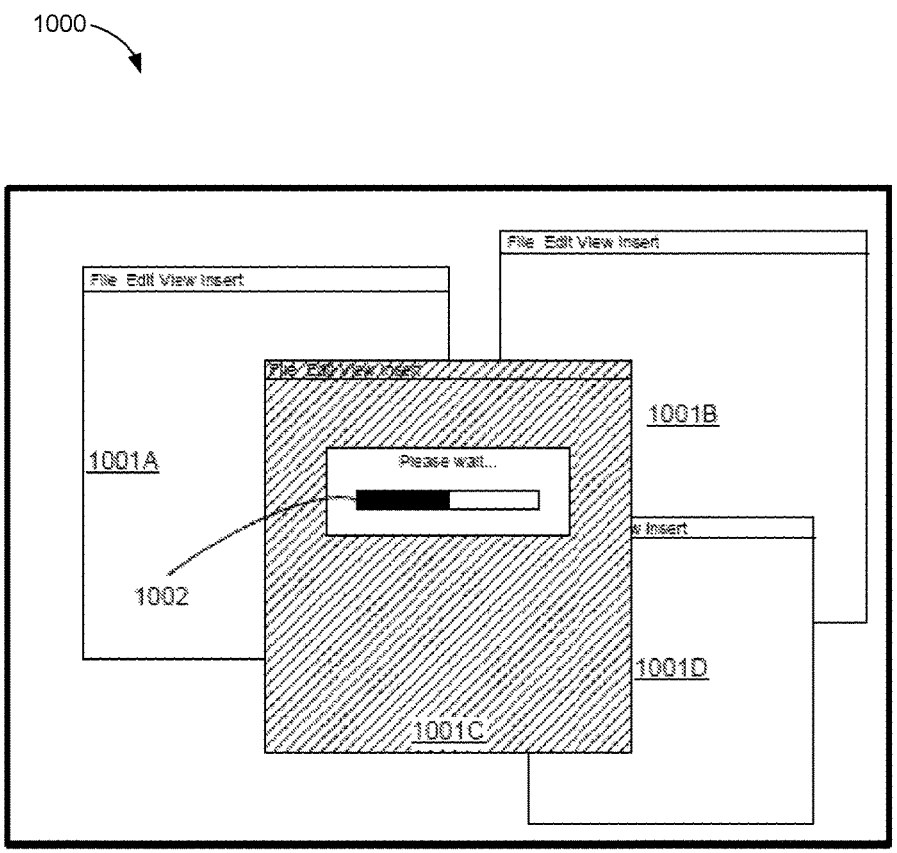
FIG. 10B depicts the example of FIG. 10A, wherein the hibernating activity is being revived, according to one embodiment.
Figure 10C:
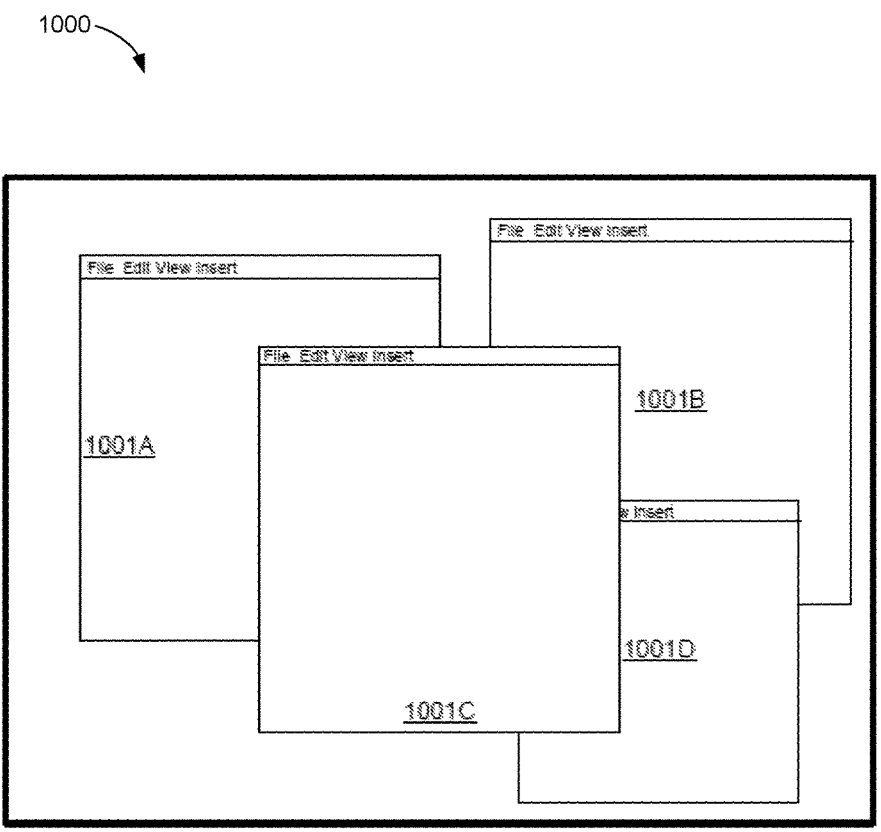
FIG. 10C depicts the example of FIG. 10A, wherein the hibernating activity has been revived, according to one embodiment.

The card metaphor described above is merely one example of an environment for implementing the present invention. In other embodiments, the present invention can be implemented in connection with other types of user interfaces, including for example a desktop-based interface having overlapping windows. Referring now to FIGS. 10A through 10C, there are shown examples of a display screen 1000 for such an implementation of the present invention.

FIG. 10A depicts an example of a display screen 100 for an embodiment of the invention using a desktop user interface having overlapping windows. Four windows 1001A, 1001B, 1001C, and 1001D are open. These windows 1001A, 1001B, 1001C, and 1001D may be associated with different software applications, or two or more windows 1001A, 1001B, 1001C, and 1001D may be associated with a single software application. In the example of FIG. 10A, an activity associated with window 1001C is hibernating, so that window 1001C includes a static snapshot of the activity with an overlaid scrim. The user can manipulate window 1001C in the same manner as other windows 1001A, 1001B, and 1001D, including resizing, moving, minimizing, maximizing, and the like, as is well known in the art of graphical user interfaces using resizable overlapping windows in an environment employing a desktop metaphor.

In FIG. 10B, revival of the activity associated with window 1001C has been triggered. For example, the user may have attempted to interact with the contents of window 1001C, or double-clicked on window 1001C, or he or she may have activated an explicit command to revive the activity. The activity is revived by restoring its previously stored state. If the underlying software application has been closed, it is re-launched. As shown in FIG. 10B, progress indicator 1002, here shown as a status bar, informs the user that revival is in progress.

In FIG. 10C, the revival operation has been completed, and the user can interact with a live user interface in window 1001C. Accordingly, the scrim and progress indicator 1002 have been removed. In one embodiment, as described above, a transition effect can be employed before presenting the live user interface.

In various embodiments, the present invention can be implemented as a system or a method for performing the above-described techniques, either singly or in any combination. In another embodiment, the present invention can be implemented as a computer program product comprising a computer-readable storage medium and computer program code, encoded on the medium, for performing the above-described techniques.

The various features described above can be implemented singly or in any combination, as will be apparent to one skilled in the art.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared, transformed, and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers and/or other electronic devices referred to in the specification may include a single processor or may be architectures employing multiple processor designs for increased computing capability.

The algorithms and displays presented herein are not inherently related to any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, desktop computer, laptop computer, consumer electronic device, television, set-top box, or the like. An electronic device for implementing the present invention may use an operating system such as, for example, Microsoft Windows Vista available from Microsoft Corporation of Redmond, Wash., or any other operating system that is adapted for use on the device. In some embodiments, the electronic device for implementing the present invention includes functionality for communication over one or more networks, including for example a cellular telephone network, wireless network, and/or computer network such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method for operating a mobile computing device, the method comprising:
concurrently running a plurality of activities, each of the plurality of activities being distinct and having a corresponding live interactive user interface displayable on a display screen of the mobile computing device;
placing a first activity of the plurality of activities into hibernation based on a detection of a low-memory condition of the mobile computing device, the first activity having a corresponding first live interactive user interface;

taking a snapshot of a current live display of the first live interactive user interface;

replacing, on the display screen, the first live interactive user interface with a first non-interactive user interface displaying a representation of the snapshot; and scrolling, in response to a directional touch input provided by a user along a horizontal axis of the display screen, the first non-interactive user interface corresponding to the hibernating first activity and at least one of the live interactive user interfaces corresponding to a non-hibernating activity along the horizontal axis towards an edge of the display screen by moving the first non-interactive user interface and the at least one live interactive user interface along the horizontal axis in the same direction as the directional touch input, wherein the hibernation of the first activity is unaffected by the scrolling or a particular display position of the corresponding first non-interactive user interface.

2. The method of claim 1, further comprising:

saving, in a storage device of the mobile computing device, activity state information corresponding to a current state of the first activity.

3. The method of claim 1, wherein at least a portion of a system resource of the mobile computing device is freed in response to the hibernation of the first activity.

4. The method of claim 1, further comprising:

reviving the first activity from hibernation based on a detection of a second condition.

5. The method of claim 4, wherein the second condition comprises an exit from the low-memory condition.

6. The method of claim 4, wherein the second condition comprises a user selection of the snapshot.

7. The method of claim 4, wherein the second condition comprises an explicit user command.

8. The method of claim 4, further comprising:

in response to reviving the first activity from hibernation, selecting another activity for hibernation.

9. The method of claim 4, further comprising:

in response to not detecting the second condition within a time period, automatically closing the first activity.

10. The method of claim 1, wherein the moving comprises displaying the first non-interactive user interface and the at least one live interactive user interface in a plurality of display positions that change based on the scrolling.

11. The method of claim 1, wherein the snapshot is taken based on the first activity being placed into hibernation.

12. The method of claim 1, wherein the directional touch input comprises a dragging gesture on the display screen along the horizontal axis.

13. A mobile computing device, comprising:

a touch-sensitive display screen;

a processor; and a memory storing instructions that, when executed by the processor, cause the mobile computing device to:

concurrently run a plurality of activities, each of the plurality of activities being distinct and having a corresponding live interactive user interface displayable on the display screen;

place a first activity of the plurality of activities into hibernation based on a detection of a low-memory condition of the mobile computing device, the first activity having a corresponding first live interactive user interface;

take a snapshot of a current live display of the first live interactive user interface;

replace, on the display screen, the first live interactive user interface with a first non-interactive user interface displaying a representation of the snapshot; and scroll, in response to a directional touch input provided by a user along a horizontal axis of the display screen, the first non-interactive user interface corresponding to the hibernating first activity and at least one of the live interactive user interfaces corresponding to a non-hibernating activity along the horizontal axis towards an edge of the display screen by moving the first non-interactive user interface and the at least one live interactive user interface along the horizontal axis in the same direction as the directional touch input, wherein the hibernation of the first activity is unaffected by the scrolling or a particular display position of the corresponding first non-interactive user interface.

14. The mobile computing device of claim 13, wherein execution of the instructions causes the mobile computing device to further:

save, in a storage device of the mobile computing device, activity state information corresponding to a current state of the first activity.

15. The mobile computing device of claim 13, wherein at least a portion of a system resource of the mobile computing device is freed in response to the hibernation of the first activity.

16. The mobile computing device of claim 13, wherein execution of the instructions causes the mobile computing device to further:

revive the first activity from hibernation based on a detection of a second condition.

17. The mobile computing device of claim 16, wherein the second condition comprises an exit from the low-memory condition.

18. The mobile computing device of claim 16, wherein the second condition comprises a user selection of the snapshot.

19. The mobile computing device of claim 16, wherein the second condition comprises an explicit user command.

20. The mobile computing device of claim 16, wherein execution of the instructions causes the mobile computing device to further:

in response to reviving the first activity from hibernation, automatically select another activity for hibernation.

21. The mobile computing device of claim 16, wherein execution of the instructions causes the mobile computing device to further:

in response to not detecting the second condition within a time period, automatically close the first activity.

22. The mobile computing device of claim 13, wherein the moving comprises displaying the first non-interactive user interface and the at least one live interactive user interface in a plurality of display positions that change based on the scrolling.

23. The mobile computing device of claim 13, wherein the snapshot is taken based on the first activity being placed into hibernation.

24. The mobile computing device of claim 13, wherein the directional touch input comprises a dragging gesture on the display screen along the horizontal axis.

25. A non-transitory computer readable medium storing instructions that, when executed by a processor of a mobile computing device, cause the mobile computing device to perform operations comprising:

concurrently running a plurality of activities, each of the plurality of activities being distinct and having a corresponding live interactive user interface displayable on a display screen of the mobile computing device;

placing a first activity of the plurality of activities into hibernation based on a detection of a low-memory condition of the mobile computing device, the first activity having a corresponding first live interactive user interface;

taking a snapshot of a current live display of the first live interactive user interface;

replacing, on the display screen, the first live interactive user interface with a first non-interactive user interface displaying a representation of the snapshot; and scrolling, in response to a directional touch input provided by a user along a horizontal axis of the display screen, the first non-interactive user interface corresponding to the hibernating first activity and at least one of the live interactive user interfaces corresponding to a non-hibernating activity along the horizontal axis towards an edge of the display screen by moving the first non-interactive user interface and the at least one live interactive user interface in a plurality of display positions along the horizontal axis in the same direction as the directional touch input, wherein hibernation of the first activity is unaffected by the scrolling or a particular display position of the corresponding first non-interactive user interface.

26. The non-transitory computer readable medium of claim 25, wherein execution of the instructions causes the mobile computing device to perform operations further comprising:

saving, in a storage device of the mobile computing device, activity state information corresponding to a current state of the first activity.

27. The non-transitory computer readable medium of claim 25, wherein at least a portion of a system resource of the mobile computing device is freed in response to the hibernation of the first activity.

28. The non-transitory computer readable medium of claim 25, wherein execution of the instructions causes the mobile computing device to perform operations further comprising:

reviving the first activity from hibernation based on a detection of a second condition.

29. The non-transitory computer readable medium of claim 28, wherein the second condition comprises an exit from the low-memory condition.

30. The non-transitory computer readable medium of claim 28, wherein the second condition comprises a user selection of the snapshot.

31. The non-transitory computer readable medium of claim 28, wherein the second condition comprises an explicit user command.

32. The non-transitory computer readable medium of claim 28, wherein execution of the instructions causes the mobile computing device to perform operations further comprising:

in response to reviving the first activity from hibernation, automatically selecting another activity for hibernation.

33. The non-transitory computer readable medium of claim 28, wherein execution of the instructions causes the mobile computing device to perform operations further comprising:

in response to not detecting the second condition within a time period, automatically closing the first activity.

34. The non-transitory computer readable medium of claim 25, wherein the moving comprises displaying the first non-interactive user interface and the at least one live interactive user interface in a plurality of display positions that change based on the scrolling.

35. The non-transitory computer readable medium of claim 25, wherein the snapshot is taken based on the first activity being placed into hibernation.

* * * * *